(12) United States Patent
Nahum et al.

(10) Patent No.: US 6,642,506 B1
(45) Date of Patent: Nov. 4, 2003

(54) SPECKLE-IMAGE-BASED OPTICAL POSITION TRANSDUCER HAVING IMPROVED MOUNTING AND DIRECTIONAL SENSITIVITIES

(75) Inventors: Michael M. Nahum, Kirkland, WA (US); Karl G. Masreliez, Bellevue, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/584,264

(22) Filed: Jun. 1, 2000

(51) Int. Cl.$^7$ ................................................. G01D 5/34
(52) U.S. Cl. ................................................. 250/231.13
(58) Field of Search .................. 250/231.13, 231.14, 250/208.1, 231.16; 356/27, 28, 28.5, 498

(56) References Cited

U.S. PATENT DOCUMENTS

| | | | |
|---|---|---|---|
| 4,671,650 A | | 6/1987 | Hirzel et al. .................. 356/28 |
| 4,743,770 A | * | 5/1988 | Lee ........................ 250/559.22 |
| 4,794,384 A | | 12/1988 | Jackson ....................... 345/166 |
| 4,967,093 A | | 10/1990 | Takemori .................. 250/559.2 |
| 5,453,840 A | | 9/1995 | Parker et al. ................ 356/400 |
| 5,653,378 A | * | 8/1997 | Olson, Jr. et al. .......... 228/124.1 |
| 6,246,482 B1 | * | 6/2001 | Kinrot et al. ................ 356/499 |
| 6,248,994 B1 | * | 6/2001 | Rose et al. ............. 250/231.13 |

FOREIGN PATENT DOCUMENTS

| | | |
|---|---|---|
| DE | 196 20 419 | 11/1997 |

(List continued on next page.)

OTHER PUBLICATIONS

Rose et al., "A laser speckle sensor to measure the distribution of static torsion angles of twisted targets", Measurement Science and Technology, IOP Publishing, vol. 9, Nol. 1, 1998, pp. 42–49.*

(List continued on next page.)

*Primary Examiner*—Robert H. Kim
*Assistant Examiner*—Chih-Cheng Glen Kao
(74) *Attorney, Agent, or Firm*—Oliff & Berridge, PLC

(57) ABSTRACT

A speckle readhead includes a light source that outputs light towards an optically rough surface. Light scattered from this surface contains speckles. The scattered light is imaged onto an image detector, captured and stored. Subsequently, a second image is captured and stored. The two images are repeatedly compared at different offsets in a displacement direction. The comparison having the highest value indicates the amount of displacement between the readhead and the surface that occurred between taking the two images. An optical system of the readhead includes a lens and an aperture. The aperture can be round, with a diameter chosen so that the average size of the speckles is approximately equal to, or larger than, the dimensions of the elements of the image detector. The dimension of the aperture in a direction perpendicular to the direction of displacement can be reduced. Thus, the imaged speckles in that direction will be greater than the dimension of the image detector elements in that direction. Such a readhead is relatively insensitive to lateral offsets. The lens can be a cylindrical lens that magnifies the relative motion along the direction of displacement but does not magnify relative motions in the direction perpendicular to the direction of displacement. The optical system can also be telecentric. Thus, the readhead is relatively insensitive to both separation and relative motions between the readhead and the surface. The light source can be modulated to prevent smearing the speckles across the image detector. The light source can be strobed to freeze the image.

33 Claims, 10 Drawing Sheets

| | FOREIGN PATENT DOCUMENTS | | | |
|---|---|---|---|---|
| JP | 56-26208 | 3/1981 | | |
| JP | 60-71911 | 4/1985 | | |
| JP | 2-297006 | 12/1990 | | |
| JP | 3-274401 | 12/1991 | | |
| JP | 4-131705 | 5/1992 | | |
| JP | 05-052517 | * 3/1993 | ........... | G01B/11/00 |
| JP | 7-151516 | 6/1995 | | |
| JP | 8-14824 | 1/1996 | | |
| JP | 8-233522 | 9/1996 | | |
| JP | 8-261717 | 10/1996 | | |
| JP | 8-261730 | 10/1996 | | |
| JP | 8-271231 | 10/1996 | | |
| WO | WO 98 53271 | 11/1998 | | |

OTHER PUBLICATIONS

Yamaguchi, Ichirou et al., "Linear and Rotary Encodes Using Electronic Speckle Correlation," *Optical Engineering*, vol. 30, No. 12, 1991.

Sutton, Michael A. et al., "Effects of Subpixel Image Restoration on Digital Correlation Error Estimates," *Optical Engineering*, vol. 27, No. 10, 1988.

Sjödahl, M. "Accuracy in Electronic Speckle Photography," *Applied Optics*, vol. 36, No. 13, 1997.

Schreier, Hubert et al., "Systematic Errors in Digital Image Correlation Caused by Intensity Interpolation," *Optical Engineering*, vol. 39, No. 11, Nov. 2000.

* cited by examiner

SPECKLE-IMAGE-BASED OPTICAL POSITION TRANSDUCER HAVING IMPROVED MOUNTING AND DIRECTIONAL SENSITIVITIES

BACKGROUND OF THE INVENTION

1. Field of Invention

This invention is directed to transducing positional displacements using speckle-image-correlation.

2. Description of Related Art

Various known devices use speckle images and correlation between speckle images to determine deformations and/or displacements. A speckle image is generated by illuminating an optically rough surface with a light source. Generally, the light source is a coherent light source, and more particularly, is a laser-generating light source, such as a laser, a laser diode, and the like. After the optically rough surface is illuminated by the light source, the light scattered from the optically rough surface is imaged onto an optical sensor, such as a charge-coupled device (CCD), a semiconductor image sensor array, such as a CMOS image sensor array, or the like.

Prior to displacement or deformation of the optically rough sensor, a first speckle image is captured and stored. Subsequently, after deformation or displacement of the optically rough surface, a second speckle image is captured and stored. The previous and subsequent speckle images are then compared on a pixel by pixel basis. In particular, a plurality of comparisons are performed. In each comparison, the previous and subsequent speckle images are offset relative to each other, and the amount of offset is increased by one image element, or pixel, between each comparison. In each comparison, the image value of a particular pixel in the previous image is multiplied by, or subtracted from, the corresponding subsequent image pixel (based on the amount of offset) and the result is accumulated. The offset having the greatest correlation between the subsequent and previous images will generate a peak or a trough when the offset is plotted against the total accumulated value.

For example, U.S. Pat. No. 4,794,384 discloses a mouse which uses speckle-image-correlation to determine two dimensional motion directions of a mouse. In particular, in the 384 patent, the speckle-image-correlation does not need to be performed at a high rate and the accuracy only needs to be on the millimeter range.

U.S. Pat. No. 4,967,093 discloses systems and methods for measuring deformation of an object using speckle-image-correlation. In particular, the 093 patent describes in detail various conventional methods for comparing two speckle images and for determining when to update a current reference speckle image with a new reference speckle image. Similarly, published Japanese Patent Application 8-271231, published October 1996, discloses additional methods for avoiding accumulating error in a speckle-image-based displacement gage.

Finally, published Japanese Patent Application 5-52517, published March 1993, discloses a speckled-image-based displacement meter that uses a rectangular or elliptically shaped slit 51 in a slit plate 5. The light beam from the laser light source passes through the slit 51 before it illuminates the optically rough surface. Thus, the light beam is shaped by the slit 51. The shaped light beam allows an amount of displacement in a main displacement direction to be measured with high sensitivity while displacement components in a perpendicular direction relative to the main displacement direction do not effect the sensitivity of the device.

SUMMARY OF THE INVENTION

However, the above-described conventional speckle-image-correlation systems either determine surface displacement of speckle images to analyze body deformations and strain, where it is desirable to maximize the speckle effect of all surface motions, for determining low-resolution motions generated by a computer mouse or other low-resolution measurement devices. In particular, in these conventional speckle-image-correlations systems, there is usually no need to determine, to a high degree of accuracy, the motion of the rigid body along one or more prescribed axes of motion.

In those prior art devices that use speckle-image-correlation in high-accuracy positioning encoders and the like, the practical problems that effectively prevent determining position to a high resolution in a commercially marketable form have not been adequately considered. In particular, these prior art high-accuracy positioning encoders and the like implicitly assume that highly stable structures and highly accurate bearing systems can be used in particular implementations of such speckle-image-correlation, high-accuracy positioning encoders and the like. However, such high-precision mechanical systems are expensive. Furthermore, at the high levels of resolution and accuracy that are commercially demanded in the art, even high-accuracy mechanical systems exhibit unwanted measurement errors, due to play the in bearings, non-planar surfaces, and the like.

This invention provides speckle-image-correlation-based position transducers that enable high-resolution determination of position or displacement.

This invention separately provides speckle-image-correlation-based position transducers that have reduced sensitivity to lateral offsets.

This invention further provides speckle-image-correlation-based position transducers that have reduced sensitivity to lateral offsets by having an aperture which is longer in the direction parallel to the direction of displacement than the aperture is in a direction perpendicular to the direction of displacement.

This invention further provides speckle-image-correlation-based position transducers that have reduced sensitivity to lateral offsets by placing a cylindrical lens between the optically rough surface and a detector.

This invention separately provides speckle-image-correlation-based position transducers that have reduced sensitivity to separations between the optically rough surface and the light source and/or a detector in a direction normal to the optically rough surface.

This invention further provides speckle-image-correlation-based position transducers that are relatively insensitive to relative motions between the optically rough surface and the light source and/or detector in the direction normal to the optically rough surface.

This invention separately provides speckle-image-correlation-based position transducers that are usable to determine displacement for optically rough objects moving at a relatively high velocity.

This invention further provides speckle-image-correlation-based position transducers that strobe the light source to freeze the image during the exposure time of the imaging device to determine displacement for optically rough objects moving at a relatively high velocity.

This invention separately provides speckle-image-correlation based position transducers that have an improved cost/performance ratio.

This invention separately provides speckle-image-correlation based position transducers that have improved robustness and economy.

In various exemplary embodiments of the speckle-image-correlation-based position transducers according to this invention, a light source outputs a light beam towards an optically rough surface. Due to diffraction, the light scattered from the optically rough surface contains a random pattern of bright spots, or speckles. The light scattered from the optically rough surface is imaged onto an image detector having a two-dimensional array of light-sensitive elements. The image captured on the image detector is input and stored. Subsequently, a second image is captured and stored. The two images are then compared on a pixel-by-pixel basis, first without any offsets between the two images in a particular displacement direction. The two images are then compared, each time at a different offset in the particular displacement direction. The comparison having the highest, or lowest, comparison value indicates the amount of displacement of the optically rough surface relative to the light source that occurred between taking the two images.

In particular, in the various exemplary embodiments of the speckle-image-correlation-based position transducers according to this invention, an optical system is placed between the optically rough surface and the image detector. In various exemplary embodiments, the optical system includes a lens and a pinhole aperture. In various exemplary embodiments of the optical system, the pinhole aperture is round and has a diameter chosen so that the average size of the speckles of the random speckle pattern is at least approximately equal to, and in various exemplary embodiment, larger than, the dimensions of the square light-sensitive elements of the image detector.

In other exemplary embodiments of the optical system, the dimension of the pinhole aperture in the direction perpendicular to the direction of displacement is reduced. As a result, the image of the speckles in the direction perpendicular to the direction of displacement is greater than the dimension of the light-sensitive elements of the image detector in that direction. Accordingly, speckle-image-correlation-based position transducers having such pinhole apertures become relatively insensitive to lateral offsets.

In yet other exemplary embodiments of the optical system, the lens is a cylindrical lens that magnifies the relative motions along the direction of displacement but does not magnify relative motions in the direction laterally perpendicular to the direction of displacement. In yet even other exemplary embodiments of the optical system, the optical system is telecentric. As a result, the speckle-image-correlation-based position transducers becomes relatively less sensitive to both separation between the optical system and the optically rough surface, as well as any relative motions between the optical system and the optically rough surface.

In various exemplary embodiments of the speckle-image-correlation-based position transducers according to this invention, the light source is modulated to prevent smearing of the speckle images across the array of light-sensitive elements of the image detector. In particular, in various exemplary embodiments, the light source is strobed for a short period of time to effectively freeze the image during the exposure time of the image detector, which is significantly longer than the strobe period of the light source.

In various exemplary embodiments of the speckle-image-correlation-based position transducer according to this invention, the light source, the optical system, and the image detector are incorporated into a readhead which is moving relative to the optically rough surface, along a one-dimensional displacement axis. In particular, in various exemplary embodiments of the light source, the light source is an optically coherent light source. In particular, in various exemplary embodiments of the coherent light source, the coherent light source is a laser.

In a first exemplary embodiment, the light beam emitted by the light source is emitted at an angle relative to an optical axis of the optical system. The optically rough surface scatters the speckle pattern towards the optical system, which images the speckle pattern on the image detector. In a second exemplary embodiment, the light beam emitted by the light source is emitted at an angle relative to the optical axis of the optical system onto a beamsplitter. That beamsplitter redirects the emitted light beam so that the beam is parallel to the optical axis before the light beam is scattered off the optically rough surface. The optically rough surface scatters the light beam back along the optical axis, through the optical system, including the beamsplitter, and onto the image detector.

In a third exemplary embodiment of the optical system, the light beam is emitted by the light source along the optical axis. In this third exemplary embodiment, the optical system is integrated into a block of material that is optically transparent at the wavelength of the light beam emitted by the light source. In particular, the lens of the optical system is either formed integrally with the block of material or is adhesively attached to block of material. Additionally, in this third exemplary embodiment, rather than a pinhole aperture formed in an otherwise opaque material, the integral optical system includes a semi-transparent thin film that is deposited onto one surface of the optically transparent material across the optical axis.

In particular, this semi-transparent thin film acts as a reverse pinhole, in that the semi-transparent thin film reflects only as much of the scattered light beam as normally is passed by the pinhole aperture. The reverse pinhole semi-transparent thin film redirects the scattered light beam within the block of optically transparent material, to a fully reflective thin-film formed on an opposite side of the block of optically transparent material. The fully reflective thin-film then reflects the speckle image pattern onto the image detector.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
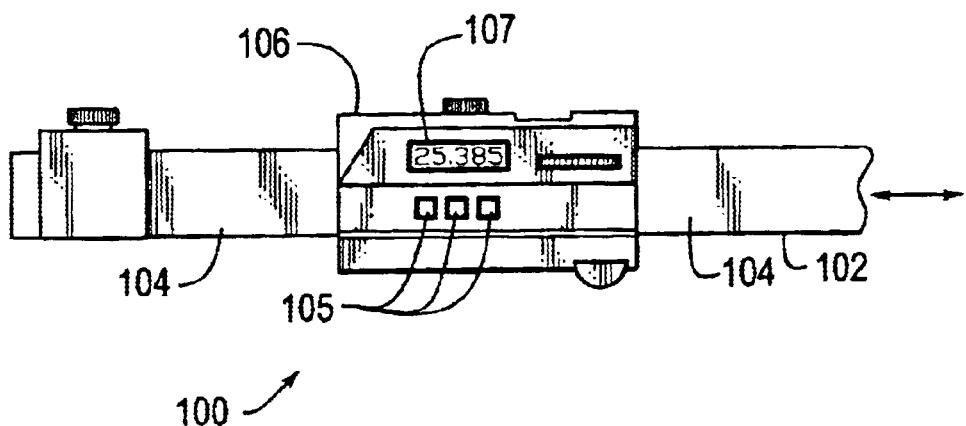
FIG. 1 is a top plan view of a first exemplary embodiment of a position measuring device incorporating a speckle-image-correlation optical position transducer according to this invention.

FIG. 1 is a plan view of a first exemplary embodiment of a position measuring device 100 incorporating a speckle-image-based optical position transducer according to this invention. As shown in FIG. 1, the position measuring device 100 includes a scale member 102 and a readhead assembly 106. In particular, an optically diffusing, or optical rough, surface 104 of the scale member 102 is positioned adjacent to an open, or illuminating, end of the readhead assembly 106. Another surface of the readhead assembly 106 includes a plurality of control buttons 105 and a position or displacement value display device 107.

In various exemplary embodiments, the display 107 is a liquid crystal display. However, the display 107 can be any known or later developed display device, including an LED display device or the like. The control buttons 105 include a millimeter/inch toggle button, and on/off button, and a set zero position button. The millimeter/inch toggle button 105 toggles the display between displaying the displacement or position in millimeter and in inches. The set zero position button 105 resets the current position of the readhead relative to the scale member as the zero position. Thus, any subsequent measurements made using the position measuring device 100 will be made relative to the reset zero position.

Figure 2:
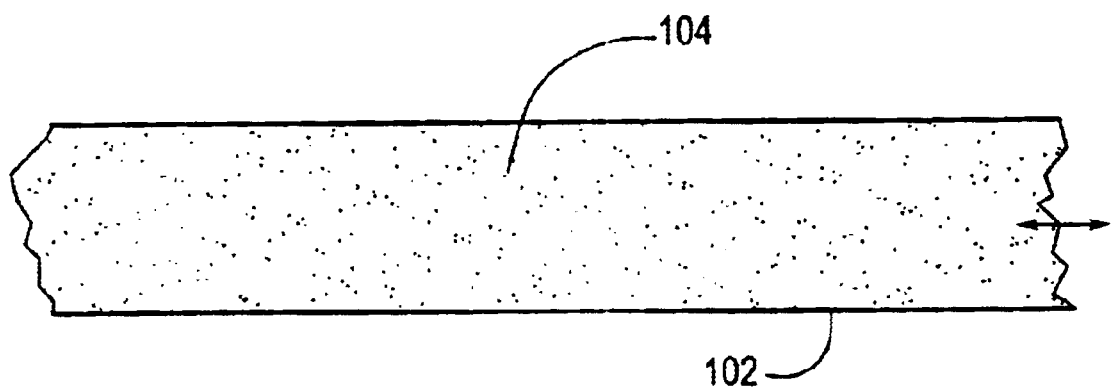
FIG. 2 is a top plan view of an optically diffusing, or optically rough, surface usable with the various exemplary embodiments of the speckle-image-correlation optical position transducer according to this invention.

FIG. 2 shows a portion of the scale member 102 in greater detail. In particular, as shown in FIG. 2, the optically diffusing, or optically rough, surface 104 of the scale member 102 diffracts or otherwise scatters light used to illuminate the optically diffusing, or optically rough, surface 104. Thus, when the optically diffusing, or optically rough, surface 104 is illuminated and scatters light towards a light detecting device, such as a camera, an electronic or digital camera, a CCD array, an array of CMOS light sensitive elements or the like, the scattered light has regions where the optically diffusing, or optically rough, surface 104 causes the diffracted light waves to positively or negatively superimpose in the image plane of the light detecting device. As a result, the image captured by the light detecting device will contain a pattern of relatively bright spots, or speckles, where the diffracted light waves positively combined to form a peak, and relatively dark spots where the diffracted light waves have negatively combined to cancel out.

The image captured by the light detecting device has an intensity pattern that depends primarily on the portion of the optically diffusing, or optically rough, surface 104 that scatters the light captured by the light detecting device and the characteristics of the optical path. In particular, the intensity pattern generated by any illuminated portion of the optically diffusing, or optically rough, surface 104 is random. The randomness of the intensity pattern is due solely to the surface properties of the optically diffusing, or optically rough, surface 104. In particular, the optically diffusing, or optically rough, surface 104 does not need to be ruled or intentionally patterned in any way to generate the intensity pattern. Thus, the random intensity pattern of any illuminated portion of the optically diffusing, or optically rough, surface 104 is not dependent upon any marks that need to be placed on the surface 104.

Figure 3:
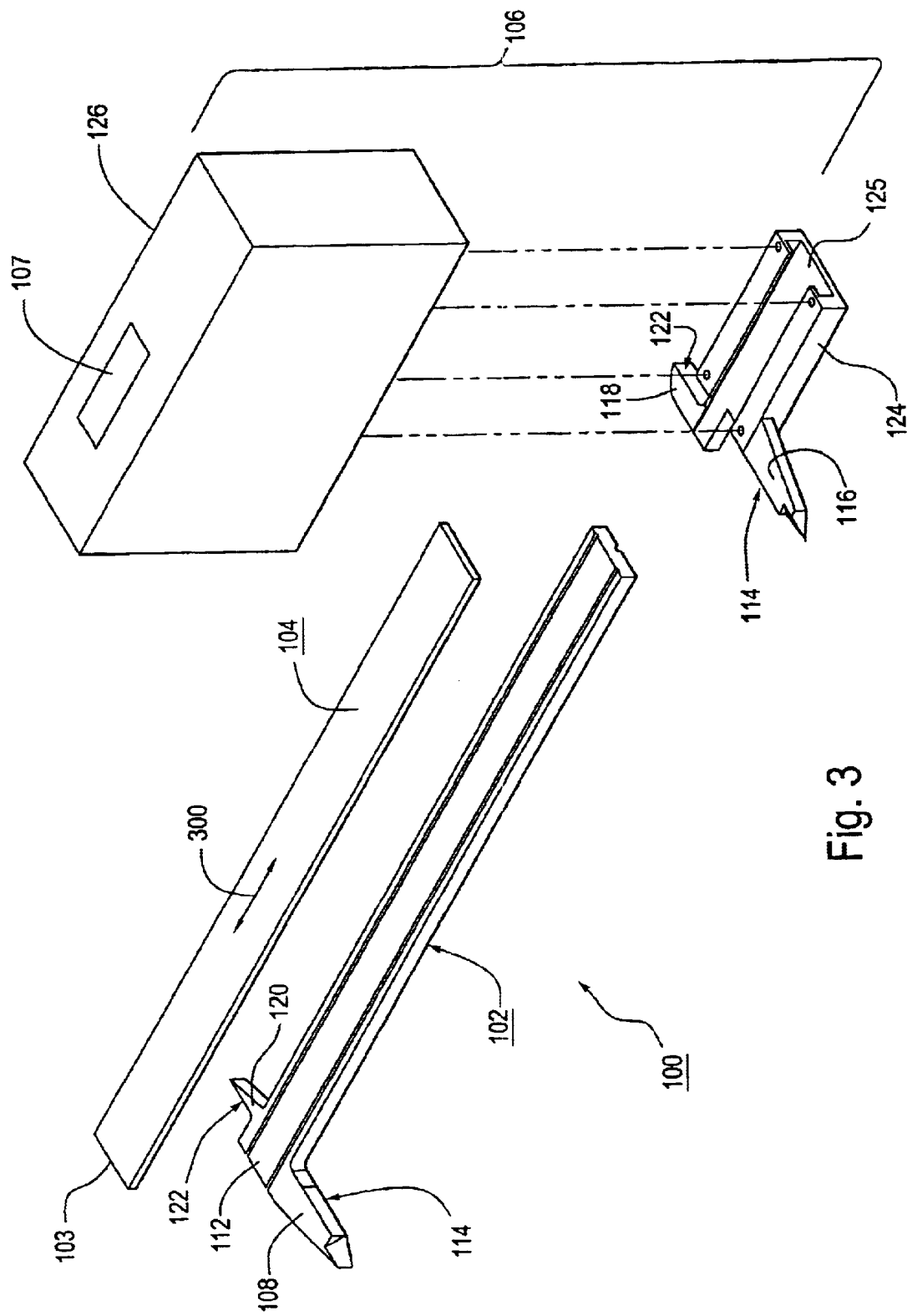
FIG. 3 is an exploded perspective view of a second exemplary embodiment of a position measuring device incorporating the speckle-image-correlation optical position transducer according to this invention.

FIG. 3 shows a second exemplary embodiment of the position measuring device 100. As shown in FIG. 3, the position measuring device 100 includes the scale member 102 having the optically diffusing, or optically rough, surface 104. In particular, as shown in FIG. 3, the scale member 102 has a channel 112 formed in it that receives a separate insert member 103 having the optically diffusing, or optically rough, surface 104. Thus, the scale member 102 can have a variety of different types of optically rough inserts 103 usable with a speckle-image-correlation-type readhead, as disclosed below. The scale member 102 includes a pair of arms 108 and 120 that extend perpendicularly from the scale member 102 relative to a measurement axis 300 of the optically diffusing, or optically rough, surface 104.

The readhead assembly 106 includes a base member 124 and a readhead 126. In particular, the scale member 102 is positionable in a slot 125 of the base member 124. When the scale member 102 is positioned in the slot 125, the optically diffusing, or optically rough, surface 104 faces an open, or illuminating, end of the readhead 126. The readhead 126 is then attached to the base member 124 to securely hold the scale member 102 in the slot 125 so that the optically diffusing, or optically rough, surface 104 is positioned at a generally stable distance from a light source and an optical system housed in the readhead 126 of the readhead assembly 106.

Like the scale member 102, the base member 124 includes a pair of arms 116 and 118 that extend perpendicularly to the base member 124 relative to the measurement axis 300. In particular, the arms 108 and 116 oppose each other at their faces 114. Thus, the arms 108 and 116 are particularly useful for measuring outside dimensions of an object to be measured. In contrast, the arms 118 and 120 have measurement surfaces 122 that face away from each other. Thus, the arms 118 and 120 are particularly useful for measuring inside diameters of objects, such as holes, voids, and the like.

FIGS. 1 and 3 show the readhead assembly 106 as a self-contained device with operating control buttons and displays. However, in other exemplary embodiments, the readhead 126 can be used independently of the guiding base member 124 and the base member 102.

Figure 4:
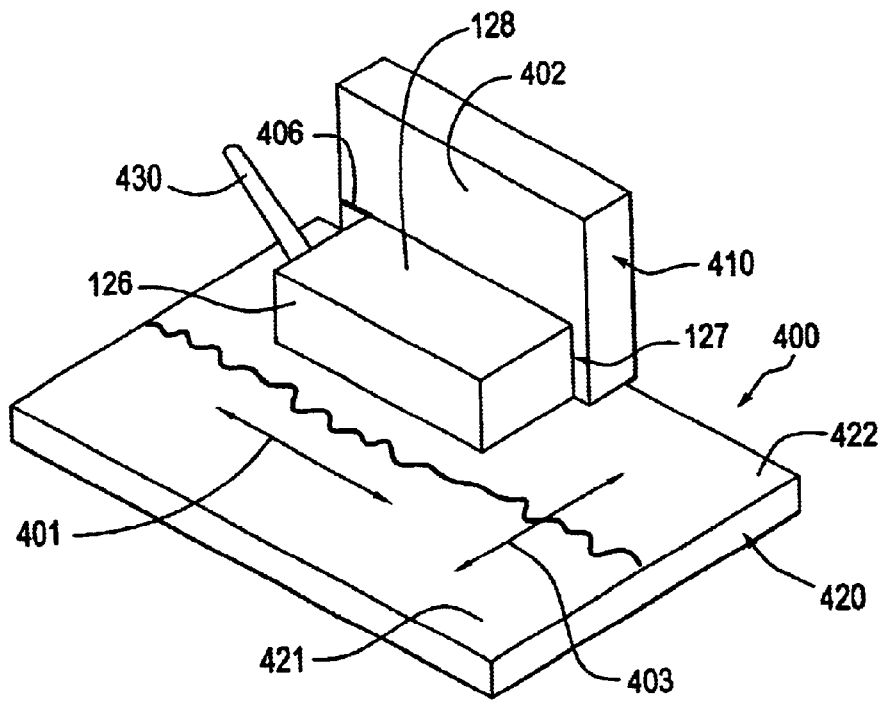
FIG. 4 is a perspective view of a third exemplary embodiment of a position measuring device incorporating the speckle-image-correlation optical position transducer according to this invention.
Figure 5:
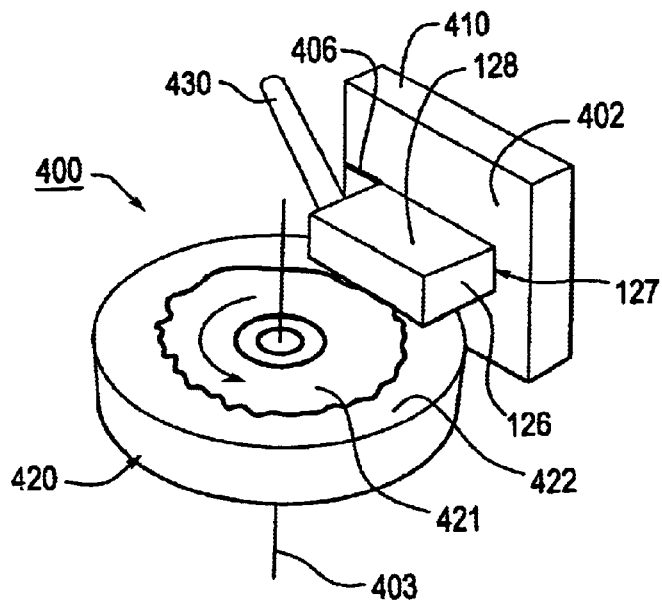
FIG. 5 is a perspective view of a fourth exemplary embodiment of a position measuring device incorporating the speckle-image-correlation optical position transducer according to this invention.
Figure 6:
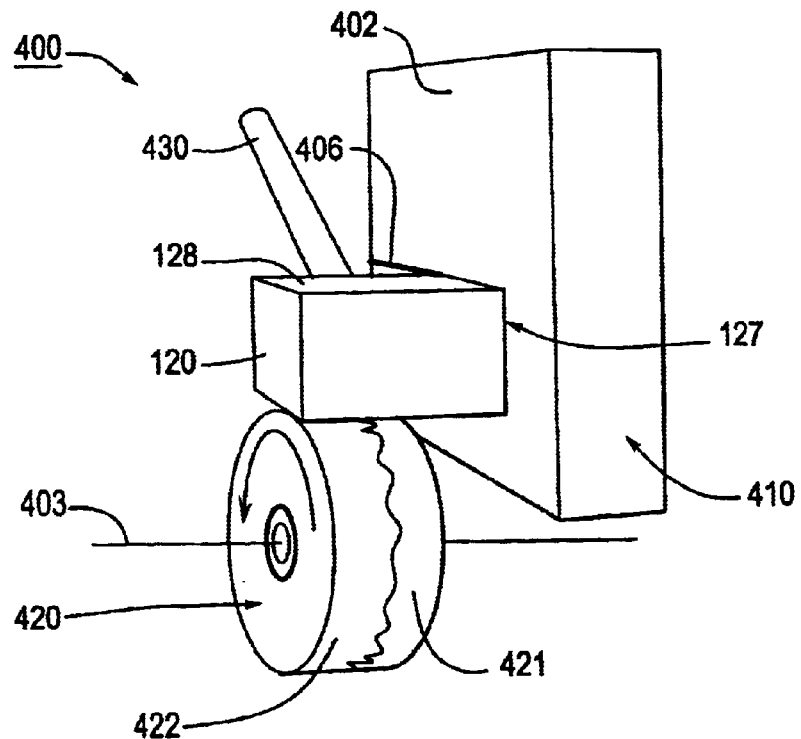
FIG. 6 is a perspective view of a fifth exemplary embodiment of a position measuring device incorporating the speckle-image-correlation optical position transducer according to this invention.

FIGS. 4–6 show third-fifth exemplary embodiments of the position measuring device 100. FIGS. 4–6 illustrate that the optically diffusing, or optically rough, surface 104 may be provided as an integral surface of a separately existing mechanism, and that the functions of the readhead 126 can be operated and displayed via remote electronics. FIG. 5 illustrates that the readhead 126 may be used to measure the motion of a rotating surface along a tangential direction. Thus, the readhead 126 can be used to infer the rotational displacement of a rotating surface or disk. Similarly, FIG. 6 illustrates that the readhead 126 may be used to measure the motion of a rotating cylinder along a tangential direction. Thus, the readhead 126 can be used to infer the rotational displacement of a rotating cylinder or shaft.

Additionally, as shown in FIGS. 4–6, the readhead assembly 106 does not need to be physically combined with a specially designed or provided scale member 102. Rather, the readhead 126 can be mounted on a first portion 410 of a machine or device 400. In particular, the machine or device 400 includes the first portion 410 and a second portion 420 that can move relative to the first portion 410 along or about at least one rotational or translational axis. Of course, it should be appreciated that this means that one of the first and second portions 410 and 420 is stationary in some frame of reference, and that the other one of the first and second portions 410 and 420 moves along or about the at least one rotational or translational axis in that frame of reference.

In particular, in FIGS. 4–6, the second portion 420 has an optically diffusing, or optically rough, portion 422 that is positionable within the field of view of the optical system housed in the readhead 126. That is, this optically diffusing, or optically rough, portion 422 of the second portion 420 forms the optically diffusing, or optically rough, surface 104 discussed above with respect to FIGS. 1–3 and below with respect to FIGS. 7–14.

As shown in FIG. 4, the second portion 420 can have a generally planar surface 421 that includes the optically diffusing, or optically rough, portion 422. In the exemplary embodiment illustrated in FIG. 4, the machine or device 400 can be a machine tool, such as a vision system having a planar stage or a milling machine having a planar X-Y table on which a workpiece to be milled can be positioned. In this case, the second portion 420 is the generally planar stage or table. In general, such generally planar second portions 420 can translate relative to the readhead assembly 106 along either one or both of two orthogonal axes 401 and 403.

In FIG. 4, the readhead 126 can be mounted to a surface 402 of the machine or device 400. This surface 402 can be an integral part of the machine or device 400, or an added mounting bracket. In the exemplary embodiment shown in FIG. 4, the surface 402 is aligned parallel to the expected axis of motion of the optically diffusing, or optically rough, portion 422. The surface 402 may also include a ledge (not shown) or a mark that is aligned parallel to the optically diffusing, or optically rough, portion 422.

An alignment surface 127 of the readhead 126, which abuts the surface 402, is constructed so that when the surface 402 is aligned parallel to the axis of relative motion of the optically diffusing, or optically rough, portion 422, the intensity pattern created on the imaging array of elements in the image detector of the readhead 126 by the light scattered from the optically diffusing, or optically rough, portion 422 translates across the array in a direction corresponding to a known predetermined spacing of the imaging array elements, during relative motion. That is, the alignment surface 127 serves to externally establish the expected alignment of the internal components of the readhead 126, relative to the expected relative motion to be measured. It should be noted that internal optical path may be bent or "twisted". In this case, the imaging array itself does not need to be physically aligned parallel to the external alignment surface 128.

The alignment surface 127, positioned relative to the surface 402, establishes the most critical alignment of the readhead 126. However, the alignment surface 127 does not ensure that the readhead 126 observes precisely in a direction normal to the optically diffusing, or optically rough, portion 422. However, when the readhead 126 observes precisely in a direction normal to the optically diffusing, or optically rough, portion 422, the most robust and accurate alignment configuration for most embodiments of the readhead 126 is obtained. Therefore, as shown in FIG. 4, the readhead 126 can further include a second alignment surface 128. An alignment feature 406 is arranged parallel to the optically diffusing, or optically rough, portion 422 and to the expected axis of travel of the optically diffusing, or optically rough, portion 422. When the second alignment surface 128 is aligned parallel to the alignment feature 406, the alignment of the readhead 126 so that it observes in a direction normal to the optically diffusing, or optically rough, portion 422 is obtained.

In various exemplary embodiments of the speckle-correlation-based readhead 126 shown in FIG. 4, the optically diffusing, or optically rough, surface 104 is formed as an integral portion of a guided member of an existing machine. For instance, the guided member of the machine can be the moving table of a machine tool that moves in one direction. Alternatively, the guided member of the machine can be the moving x-y table of a microscope that moves parallel to the plane defined by the surface 104. It should be appreciated that the displacement determining methods described herein for using a single direction in an imaging detector to measure displacement of a surface along a first axis can also be applied along a second orthogonal direction in an imaging detector, to measure displacement of the same surface along a second axis orthogonal to the first axis. This may be done using two separate and orthogonal 1-dimensional imaging detector arrays, using the two orthogonal directions of a 2-dimensional imaging detector array, or using two separate 2-dimensional detector arrays, where each detector array is used to measure displacement in one of the two orthogonal dimensions.

In contrast, as shown in FIG. 5, the second portion 420 can have a more or less generally circular shape and a generally planar surface that includes the optically diffusing, or optically rough, portion 422. In the exemplary embodiment illustrated in FIG. 5, the machine or device 400 can be a rotor of a motor, a rotary encoder or any other known or later developed element that rotates about the rotational axis 403 relative to the readhead 126. It should also be appreciated that, in various other exemplary embodiments, the readhead 126 and the first portion 410 are the devices that rotate about the axis 403 in the particular frame of reference. In this case, the second portion 420 and the optically diffusing, or optically rough, portion 422 can have any desired shape and in particular do not need to be circular in any way, so long as the annular field of view swept out by the optical system of the readhead assembly 106 remains substantially within the bounds of the optically diffusing, or optically rough, portion 422 as the readhead 126 rotates about the rotational axis 403.

As shown in FIG. 6, in contrast to both the third and fourth exemplary embodiments, in the fifth exemplary embodiment, the second portion 420 can have a more or less cylindrical shape and a generally cylindrical surface that includes the optically diffusing, or optically rough, portion 422. In the exemplary embodiment illustrated in FIG. 6, the machine or device 400 can be a rotor of a motor, a rotary encoder, a pulley or a belt on a pulley, or any other known or later developed element that rotates about the rotational axis 403 relative to the readhead 126. It should also be appreciated that, in various other exemplary embodiments, the readhead 126 and the first portion 410 are the devices that rotate about the axis 403 in the particular frame of reference. In this case, the second portion 420, outside of the region occupied by the optically diffusing, or optically rough, portion 422, can have any desired shape and in particular does not need to be cylindrical in any way, so long as the optically diffusing, or optically rough, portion 422 is cylindrical so that the readhead assembly 106 will remain at a substantially constant distance from the optically diffusing, or optically rough, portion 422 as the readhead 126 rotates about the rotational axis 403.

Figure 7:
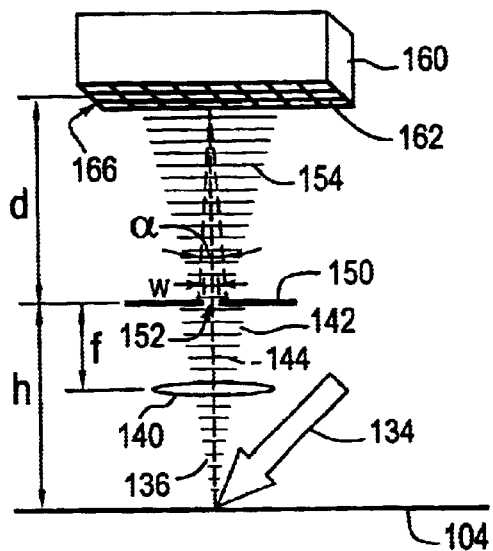
FIG. 7 illustrates the general operation and arrangement of various elements of various exemplary embodiments of the speckle-image-correlation optical position transducer according to this invention.

FIG. 7 generally illustrates the operation and general arrangement of various optical elements of the speckle-image-based optical position transducer according to this invention. As shown in FIG. 7, a light beam 134 emitted by a light source (not shown) is directed onto the optically diffusing, or optically rough, surface 104 and illuminates a portion of the optically diffusing, or optically rough, surface 104. As a result, the illuminated portion of the optically diffusing, or optically rough, surface 104 both scatters and diffracts light about an optical axis 144.

It should be appreciated that, when the optical axis or direction of scattered light is discussed herein, the optical axis or direction of scattered light is defined by the central ray of the scattered light, where the central ray is that ray that passes through the centers of the lens 140 and the pinhole aperture 152.

The light scattered and/or diffracted from the illuminated portion of the optically diffusing, or optically rough, surface 104 about the optical axis 144 passes through a lens 140. In various exemplary embodiments, the lens 140 collects the light 136 scattered from the illuminated portion of the optically diffusing, or collects the scattered light 136 from optically rough, surface 104. In general, when the lens 140 collects the light 136 gathered from the illuminated portion of the optically diffusing, or optically rough, surface 104, and the limiting aperture 152 is located at the back focal plane of the lens 140, the optical system becomes telecentric.

The lens 140 then projects the collected light 142 from the illuminated portion of the optically diffusing, or optically rough, surface 104 onto a pinhole plate 150 having a pinhole aperture 152. In particular, the lens 140 is spaced from the plate 150 having the pinhole aperture by a distance f, which is equal to the focal length of the lens 140. Moreover, it should be appreciated that the pinhole plate 150 having the pinhole aperture 152 is spaced from the illuminated portion of the optically diffusing, or optically rough, surface 104 by a distance h.

In particular, by locating the plate 150 at the focal distance of the lens 140, the optical system of the speckle-image-based optical position transducer according to this invention becomes telecentric. In particular, in telecentric systems, the optical system, and thus the speckle-image-based optical position transducer according to this invention, becomes relatively less sensitive to changes in the gap distance h. Moreover, by using a pinhole 152 in the pinhole plate 150, the speckle size and the dilation of the speckle pattern depends solely on the dimensions of the pinhole 152 and, more particularly, becomes independent of any lens parameters of the lens 140.

The collected light 142 from the lens 140 passes through the pinhole 152. In particular, the light 154 passed by the pinhole 152 is projected along the optical axis 144 and onto an array 166 of image elements 162 of a light detector 160. In particular, the light detector 160 can be a charge-coupled device (CCD), an array of CMOS light sensitive elements, or any other known or later developed type of light sensitive material or device that can be organized into an array of independent and individual light sensing elements. In particular, the surface of the array 166 of the light sensitive elements 162 onto which the passed portion 154 of the collected light 142 from the lens 140 is separated from the plate 150 by distance d. More particularly, the speckle size depends only on the angle α subtended by the dimensions of the pinhole 152 and a distance d between the pinhole plate 150 and the surface formed by the array 166 of image elements 162 of the light detector 160.

The approximate size D of the speckles within the detected portion of the light received from the illuminated portion of the optically diffusing, or optically rough, surface 104 onto the array 166 of image elements 162 is:

$$D \approx \lambda/\tan(\alpha) = (\lambda * d)/w \qquad (1)$$

where:

λ is the wavelength of the light beam 134; and w is the diameter of a round pinhole.

In various exemplary embodiments, typical values for Eq. 1 include: λ=0.6 µm, d=10 cm (100,000 µm), and w=1 mm (1,000 µm). As a result, the approximate speckle size D is 60 µm.

Figure 8:
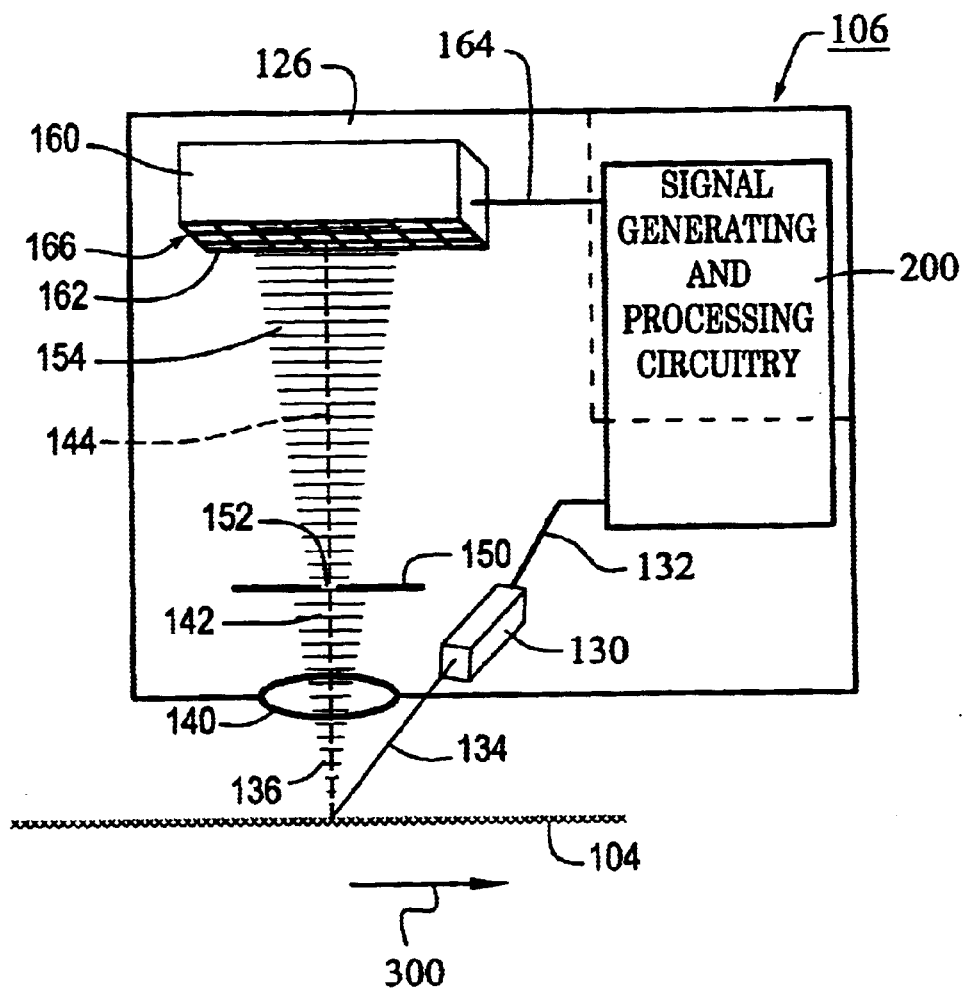
FIG. 8 illustrates the arrangement and operation of a first exemplary embodiment of a readhead of the speckle-image-correlation optical position transducer according to this invention.

FIG. 8 shows a first exemplary embodiment of the readhead assembly 106 useable with the speckle-image-based optical position transducer according to this invention. As shown in FIG. 8, the readhead assembly 106 includes the light source 130, the lens 140, the pinhole plate 150 having the pinhole 152 and the light detector 160 having the array 166 of the image elements 162. The readhead assembly 106 also includes signal generating and processing circuitry 200. One exemplary embodiment of the signal generating and processing circuitry 200 is described below with respect to FIG. 12.

As shown in FIG. 8, a signal line 132 from the signal generating and processing circuitry 200 is connected to the light source 130 and provides a drive signal to drive the light source 130. In response to the drive signal on the signal line 132, the light source 130 outputs the beam of light 134 to illuminate a portion of the optically diffusing, or optically rough, surface 104. In various exemplary embodiments, the light source 130 can be a white-light source. In this case, the light will generate an image of the illuminated portion, which can be projected onto the array 166 of the image elements 162. However, while this image can be correlated in the same way that a speckle image can be correlated, this image will not include speckles formed by scattering from the optically diffusing, or optically rough, surface 104.

In various other exemplary embodiments, the light source 130 is a coherent light source. In general, the coherent light source 130 will be a laser beam emitting light source. However, any other known or later developed coherent light source that is capable of emitting a coherent beam of light can be used in place of a laser.

When the coherent light source 130 is driven by the drive signal on the signal line 132 and outputs the coherent light beam 134, the coherent light beam 134 illuminates a portion of the optically diffusing, or optically rough, surface 104 that lies along the optical axis of the optical system of the readhead assembly 106. In particular, the light 136 scattered from the illuminated portion of the optically diffusing, or optically rough, surface 104 is gathered by the lens 140. The collected light 142 from the lens 140 is projected along the optical axis 144 onto the pinhole plate 150 and passes through the pinhole 152. The portion of the light 154 passing through the pinhole 152 is projected along the optical axis 144 onto the array 166 of the image elements 162 of the light detector 160. A signal line 164 connects the light detector 160 and the signal generating and processing circuitry 200. In particular, each of the image elements 162 of the array 160 can be individually addressed to output a value representing the light intensity on that image element 162 over the signal line 164 to the signal generating and processing circuitry 200.

In the first exemplary embodiment of the readhead assembly 106 shown in FIG. 8, the coherent light beam 134 emitted by the coherent light source 130 is emitted at a non-normal angle to the optical axis 144. Because the light beam 134 is at a non-normal angle to the optical axis 144, if the light beam 134 underfills the effective field of view of the optically diffusing, or optically rough, surface 104, changes in the gap distance h between the pinhole 152 and the illuminated portion of the optically diffusing, or optically rough, surface 104 effectively changes the portion of the optically diffusing, or optically rough, surface 104 that actually contributes to the speckle pattern projected onto the light detector 160. This change is independent of any relative movement along the measurement axis 300 between the readhead assembly 106 and the optically diffusing, or optically rough, surface 104. As a result, if the light beam 134 underfills the effective field of view of the optically diffusing, or optically rough, surface 104, the positions of speckles in the light 136 scattered from the optically diffusing, or optically rough, surface 104 will be imaged onto the array 166 of the image elements 162 at positions that depend upon the gap distance or separation h. Thus, if the light beam 134 underfills the effective field of view of the optically diffusing, or optically rough, surface 104, such displacements of the speckle pattern onto the array 166 of the image elements 162 due solely to undesirable changes in the gap separation or distance h will be incorrectly converted into apparent translations between the readhead assembly 106 and the optically diffusing, or optically rough, surface 104.

Figure 9:
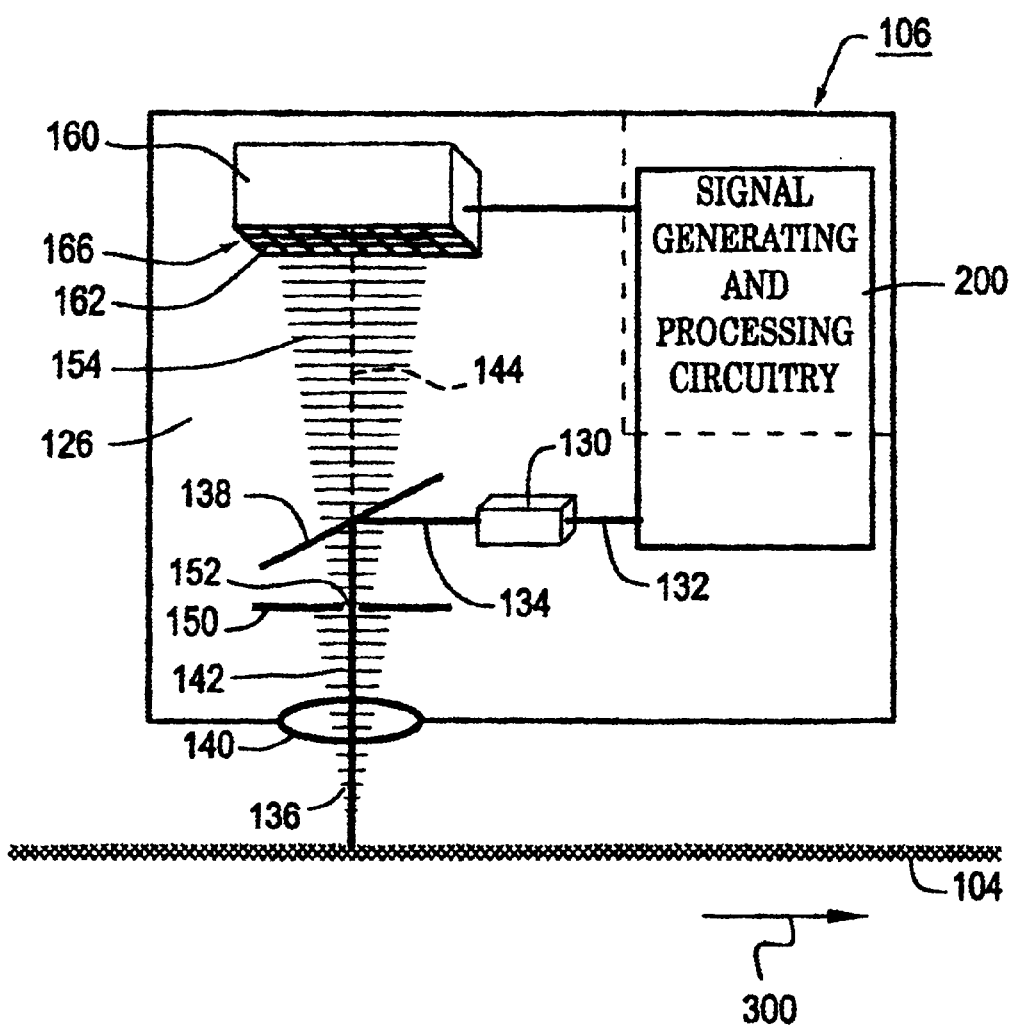
FIG. 9 illustrates the arrangement and operation of a second exemplary embodiment of a readhead of the speckle-image-correlation optical position transducer according to this invention.

FIG. 9 illustrates the arrangement and operation of a second exemplary embodiment of the readhead assembly 106 of the speckle-image-based optical position transducer according to this invention. As shown in FIG. 9, the readhead assembly 106 includes the coherent light source 130, the lens 140, the pinhole plate 150 having the pinhole 152, the light detector 160 having the array 166 of the image elements 162, and the signal generating and processing circuitry 200, as shown in the first exemplary embodiment shown in FIG. 8. However, the second exemplary embodiment of the readhead assembly 106 also includes a beam splitter 138 positioned between the pinhole plate 150 and the light detector 160.

In particular, the coherent light beam 134 emitted by the coherent light source 130 no longer directly illuminates the illuminated portion of the optically diffusing, or optically rough, surface 104, as in the first exemplary embodiment of the readhead assembly 106 shown in FIG. 8. Rather, the coherent light beam 134 is directed onto the beam splitter 138, which redirects the coherent light beam 134 along the optical axis 144, and through the pinhole 152 and the lens 140, before the coherent light beam 134 illuminates the illuminated portion of the optically diffusing, or optically rough, surface 104.

As in the first exemplary embodiment of the readhead assembly 106 shown in FIG. 8, the illuminated portion of the optically diffusing, or optically rough, surface 104 scatters light 136 onto the lens 140. The lens 140 directs the collected light 142 passing through the lens 140 onto the pinhole plate 150. The pinhole 152 passes the portion of light 154 and directs it onto the array 166 of the image elements 162.

In particular, in this second exemplary embodiment of the readhead assembly 106, the readhead assembly 106 is generally more compact than the first exemplary embodiment of the readhead assembly 106 shown in FIG. 8. Additionally, in various exemplary embodiments, the second exemplary embodiment of the readhead assembly 106 delivers better characteristics for the speckles, because it is able to produce speckles having a higher contrast than the speckles in the first exemplary embodiment of the readhead assembly 106 shown in FIG. 8.

Likewise, because the coherent light beam 134 is projected along the image axis 144 before the redirected coherent light beam 134 illuminates the illuminated portion of the optically diffusing, or optically rough, surface 104, changes in the gap separation or distance h between the illuminated portion of the optically diffusing, or optically rough, surface 104 and the pinhole plate 150 does not cause the portion of the optically diffusing, or optically rough, surface 104 actually illuminated by the coherent light beam 134 to be displaced, as in the first exemplary embodiment of the readhead assembly 106 shown in FIG. 8. Thus, the second exemplary embodiment of the readhead assembly 106 shown in FIG. 9 is easier to operate over a large range of gaps h, and is more independent of the gap h and any changes in the gap separation or distance h that may occur between image capture operations.

Finally, because the coherent light beam 134 is redirected along the optical axis by the beam splitter 138, it is easier to align the optical elements of the readhead assembly 106 and to obtain the collected light 142 from the lens 140. However, because of the additional elements and the need to precisely align the light beam 134 with the optical axis 144 after it is redirected by the beam splitter 138, the second exemplary embodiment of the readhead assembly 106 is more complicated to assemble and more costly to manufacture than the first exemplary embodiment of the readhead assembly 106 shown in FIG. 8.

Figure 10:
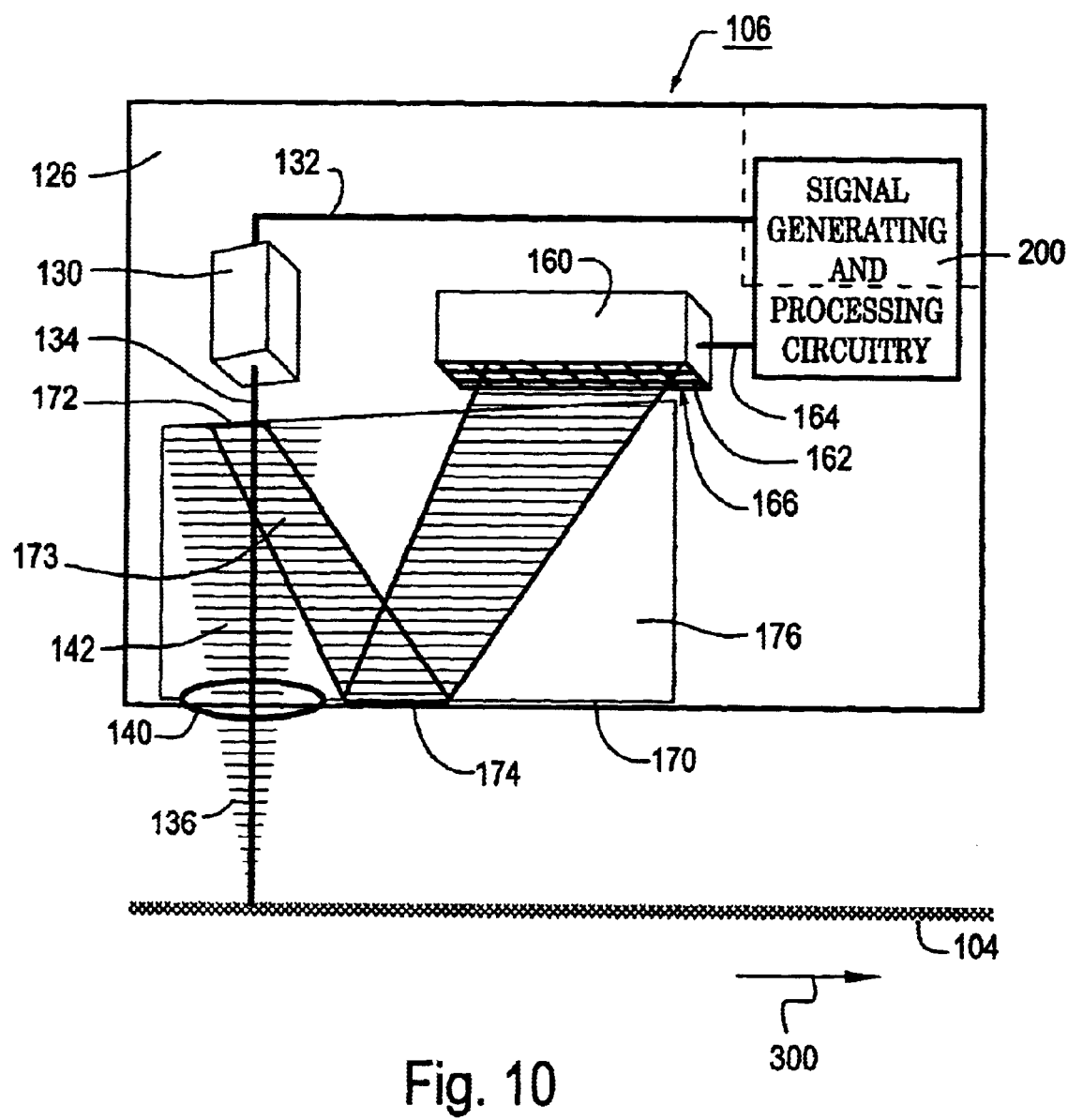
FIG. 10 illustrates the arrangement and operation of a third exemplary embodiment of a readhead of the speckle-image-correlation optical position transducer according to this invention.

FIG. 10 shows a third exemplary embodiment of the readhead assembly 106 sable with the speckle-image-based optical position transducer according to this invention. As shown in FIG. 10, the optical system comprising the physically independent lens 140 and the physically independent pinhole plate 150 and, optionally, the physically independent beam splitter 138, as discussed above, is replaced by an integral or combined optical system 170.

In particular, the readhead assembly 106 includes the coherent light source 130, the optical system 170, which includes a integrally formed or otherwise attached lens 140, a reverse pinhole metal film 172, and a reflective metal film 174 all integrally formed with, formed on, or otherwise attached to a block of material 176 that is optically transparent to the particular wavelength of the coherent light beam 134 emitted by the coherent light source 130. The third exemplary embodiment of the readhead assembly 106 shown in FIG. 10 also includes the light detector 160 having the array 166 of the image elements 162 and the signal generating and processing circuitry 200.

In operation, in the third exemplary embodiment of the readhead assembly 106 shown in FIG. 10, the coherent light beam 134 emitted by the coherent light source 130 is aligned with the optical axis 144 when emitted. The coherent light beam 134 passes through the semi-transparent metal film 172 deposited on one surface of the block of optically transparent material 176 and passes through the semi-transparent metal film 172 and the lens 140 and illuminates an illuminated portion of the optically diffusing, or optically rough, surface 104. In various other exemplary embodiments, the metal film can be fully reflective, and include a small opening or hole through which the light beam 134 can pass.

The light 136 scattered from the illuminated portion of the optically diffusing, or optically rough, surface 104 passes through the lens 140 and is projected onto the semi-transparent metal film 172. In particular, the lens 140 can be formed integrally with the block of optically transparent material 176. Alternately, the lens 140 can be a separately formed element that is later attached to the block of optically transparent material 176. In various exemplary embodiments, the lens 140 is adhesively attached to the block of optically transparent material 176. However, it should be appreciated that any other known or later developed method for attaching the separately formed lens 140 to the block of optically transparent material 176 can be used.

The semi-transparent metal film 172 acts as a reverse pinhole, in that the semi-transparent metal film 172 reflects only as much of the light 142 from the lens 140 onto the reflective metal film 174 as would be passed by the pinhole 152 in the pinhole plate 150 in the first and second exemplary embodiments of the readhead assembly 106 shown in FIGS. 8 and 9. That is, in the first and second exemplary embodiments of the readhead assembly 106 shown in FIGS. 8 and 9, the pinhole plate 150 blocks most of the light 142 projected onto the pinhole plate 150 by the lens 140. The pinhole 152 passes only a portion 154 of the collected light 142 projected onto the pinhole plate 150.

Similarly, the semi-transparent metal film 172 effectively reflects only a portion of the light 142 from the lens 140 onto the reflective metal film 174. In particular, the portions of the collected light 142 which are not reflected by the semi-transparent metal film 172 onto the reflective metal film 174 exit the block of optically transparent material 176. These portions of the light 142 are thus removed in the same way that the portions of the collected light 142 blocked by the pinhole plate 150 in the first and second exemplary embodiments of the readhead assembly 106 are removed. Thus, the semi-transparent film 172 acts as a "reverse" pinhole.

The portion of the light 173 reflected by the semi-transparent metal film 172 is directed onto the reflective metal layer 174. The reflective metal layer 174 redirects the portion of the light 173 out of the block of optically transparent material 176 and onto the array 166 of the image elements 162 of the light detector 160.

In particular, in the third exemplary embodiment of the readhead assembly 106, the portion of light 136 scattered from the illumination portion of the optically diffusing, or optically rough, surface 104 is folded to reduce the dimensions of the readhead assembly 106. Not only is this configuration of the readhead assembly 106 more compact, it is also more robust, as it is less sensitive to temperature variations than either the first or second exemplary embodiments of the readhead assembly 106 shown in FIGS. 8 and 9.

Regardless of which exemplary embodiment of the readhead assembly 106 is implemented in a particular speckle-image-based optical position transducer according to this invention, the signal generating and processing circuitry 200 operates essentially the same. In particular, the signal generating and processing circuitry 200 outputs a drive signal on the signal line 132 to drive the coherent light source 130 to emit the coherent light beam 134. The light beam 134 illuminates a portion of the optically diffusing, or optically rough, surface 104. The light scattered and diffracted from the illuminated portion of the optically diffusing, or optically rough, surface 104 is imaged onto the array 166 of the image elements 162 of the light detector 160. The signal generating and processing circuitry 200 then inputs a plurality of signal portions over the signal line 164, where each signal portion corresponds to the image value detected by one of the individual image elements 162. The signal portions received from the light detector 160 by the signal generating and processing circuitry 200 for a particular image are then stored in memory.

A short time later, the signal generating and processing circuitry 200 again drives the coherent light source 130 and inputs an image signal from the light detector 106 over the signal line 164. In various exemplary embodiments, the subsequent image is generated and captured within approximately 100 Us of the previous image. However, it should be appreciated that any appropriate time period between capturing the previous and subsequent images can be used. In particular, an appropriate time period will depend upon the dimensions of the array 166, especially the dimensions of the array 166 in the direction along the measurement axis 300, the magnification of the image projected onto the array 166 by the optical system of the readhead assembly 106 and the velocity of relative displacement between the readhead assembly 106 and the optically diffusing, or optically rough, surface 104. In particular, the second image must be generated and acquired within a sufficiently short time period that the previous and subsequent images are sufficiently overlapped that a correlation between the two images can be determined.

In particular, the subsequent and previous images are processed to generate a correlation function. In practice, the subsequent image is shifted digitally relative to the previous image over a range of offsets that includes an offset that causes the two images to align. The correlation function is simply a measure of the amount of offset required to get the two images to align as the images are digitally shifted. It should be appreciated that any known or later developed algorithm can be used to determine the correlation function between the subsequent and previous images.

Referring back briefly to FIGS. 4–6, position signals from the readhead assembly 106 can be transmitted to remotely located signal processing electronic over a cable 430. It should be appreciated that, in various exemplary embodiments corresponding to the third-fifth exemplary embodiments shown in FIGS. 4–6, the readhead assembly 106 can include the signal generating and processing circuitry 200. In this case, the position value signals are output over the cable 430 to the remotely located signal processing electronics. In contrast, in various other exemplary embodiments corresponding to the third-fifth exemplary embodiments shown in FIGS. 4–6, the readhead assembly 106 can exclude, except for the light detector interface 230 discussed below, the signal generating and processing circuitry 200. In this case, the image signals from the light detector 160 are output over the cable 430 to the remotely located signal processing electronics. The remotely located signal processing electronics will include, in this case, those portions of the signal generating and processing circuitry 200 excluded from the readhead assembly 106.

Alternatively, in various other exemplary embodiments, the remotely located signal processing electronics can input the image signals from the light detector interface 230 or position signals from the signal generating and processing circuitry 200 and output signals compatible with servo systems, such as numerically controlled machine tools and the like.

For those exemplary embodiments where the readhead assembly 106 rotates relative to a stationary second portion 420, the cable 430 can be replaced with a wireless link to allow the readhead assembly to communicate with the remotely located signal processing electronics. In various exemplary embodiments, the wireless link can be an infrared transmitter, a radio-frequency transmitter, such as a digital or analog cellular telephone transmitter, or any other known or later developed wireless link. In this case, the wireless receiver can be connected directly to the remotely located signal processing electronics or can be connected to the remotely located signal processing electronics over a distributed network and/or a switched telephone network.

Figure 11:
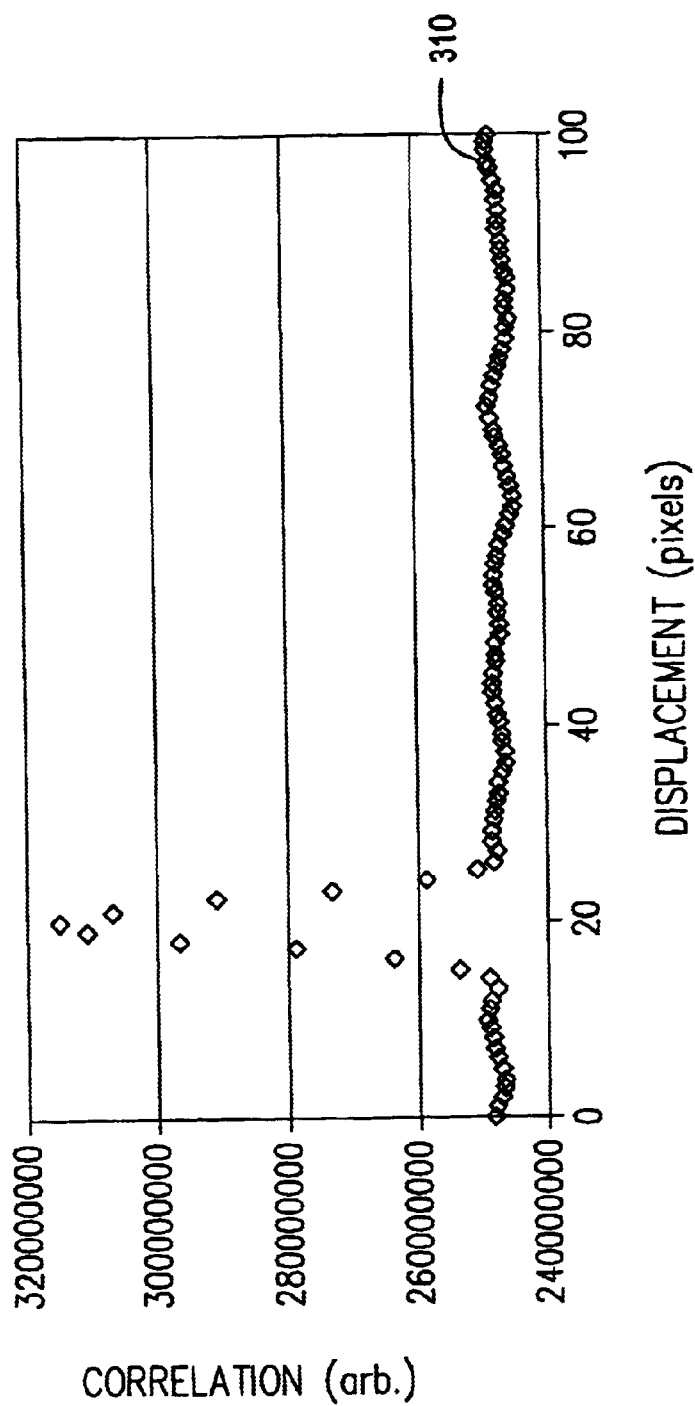
FIG. 11 is a graph illustrating the results of comparing first and second captured speckled images when offset at various pixel displacements.

FIG. 11 shows one exemplary embodiment of a correlation function. In particular, the correlation function includes a plurality of discrete data points that are separated by a predetermined distance. This distance depends upon the effective center-to-center spacing between the individual image elements 162 in the direction along the measurement axis 300 and the amount of magnification of the displacement of the optically diffusing, or optically rough, surface 104 by the optical system of the readhead assembly 106.

For example, if the effective center-to-center spacing of the image elements 162 in the direction along the measurement axis is 10 $\mu$m, and the optical system of the readhead assembly 106 magnifies the surface displacement by 10×, then a 1 $\mu$m displacement of the illuminated portion of the optically diffusing, or optically rough, surface 104 will be magnified into a 10 $\mu$m displacement of the speckle pattern on the image elements 162.

Each data point is generated by digitally shifting the subsequent image relative to the previous image by the effective center-to-center spacing of the image elements 162 in the direction along the measurement axis 300. Because, in this case, the effective center-to-center spacing of the image elements 162 corresponds to a 1 $\mu$m displacement of the optically diffusing, or optically rough, surface 104, the discrete data points will be separated in this case by a distance of about 1 $\mu$m. In particular, the correlation function of FIG. 11, which is displayed in arbitrary units, will have a peak, or a trough, at the displacement value where the image, or intensity, pattern in each of the previous and subsequent images align. In the exemplary embodiment shown in FIG. 11, this peak occurs at a displacement of approximately 20 pixels or image elements 162.

A true peak finding algorithm is then used to determine the location of the actual peak at a sub-pixel accuracy. In particular, this peak finding algorithm is an interpolation routine that fits a second order, or higher order, curve to the correlation function. In general, only the discrete data points that are substantially higher than the background noise level are used in this peak finding algorithm.

In various exemplary embodiments of the signal generating and processing circuitry 200, the subsequent image is stored as the previous image and a third, new subsequent image is acquired and compared to the stored previous image and the displacement is determined. This process is then continuously repeated. In contrast, in various other exemplary embodiments of the signal generating and processing circuitry 200, the subsequent image is stored in place of a previous image only when the displacement between the two images rises above a predetermined threshold amount of displacement.

Figure 12:
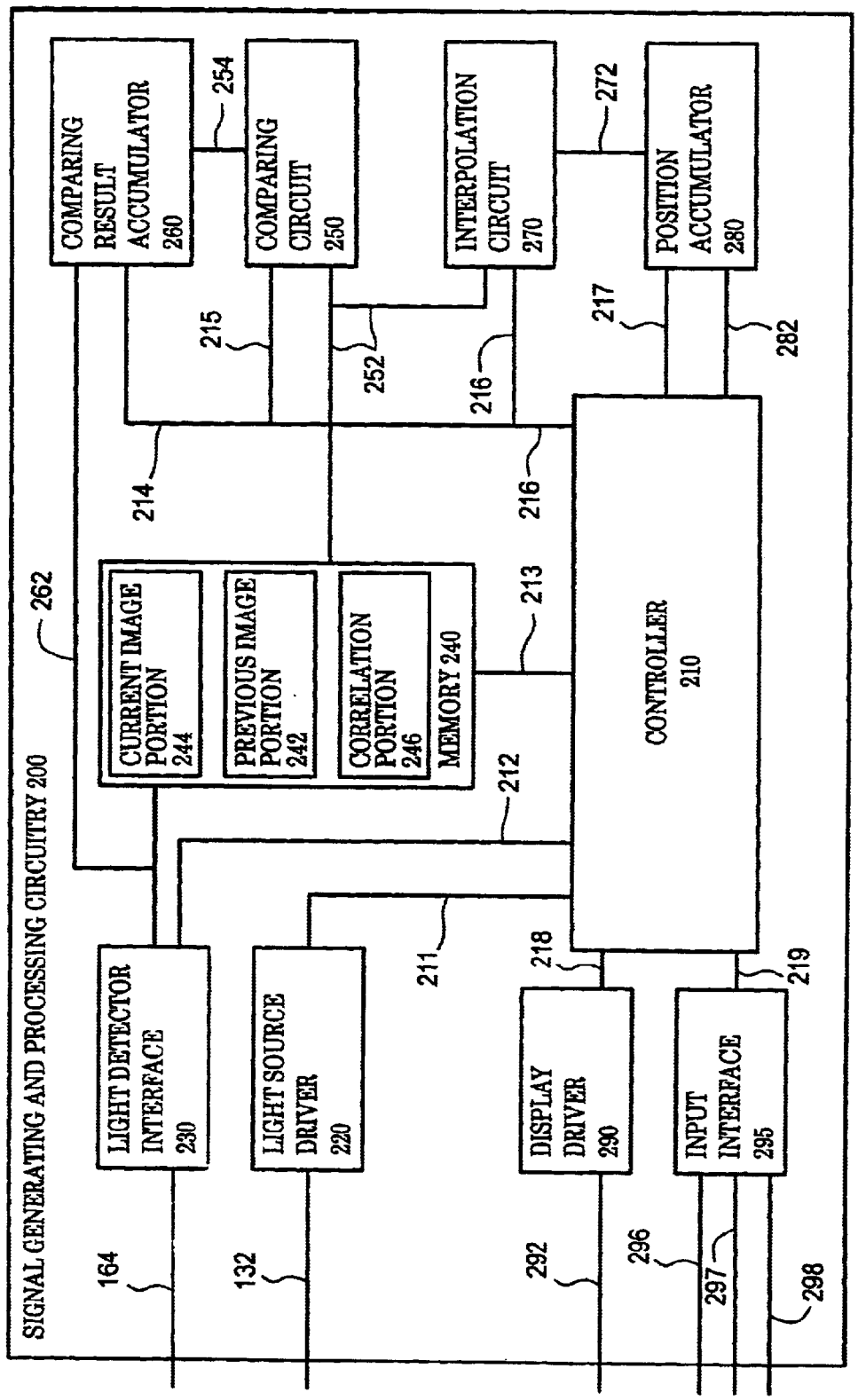
FIG. 12 is a block diagram outlining one exemplary embodiment of the signal generating and processing circuitry of the speckle-image-based optical position transducer according to this invention.
Figure 13:
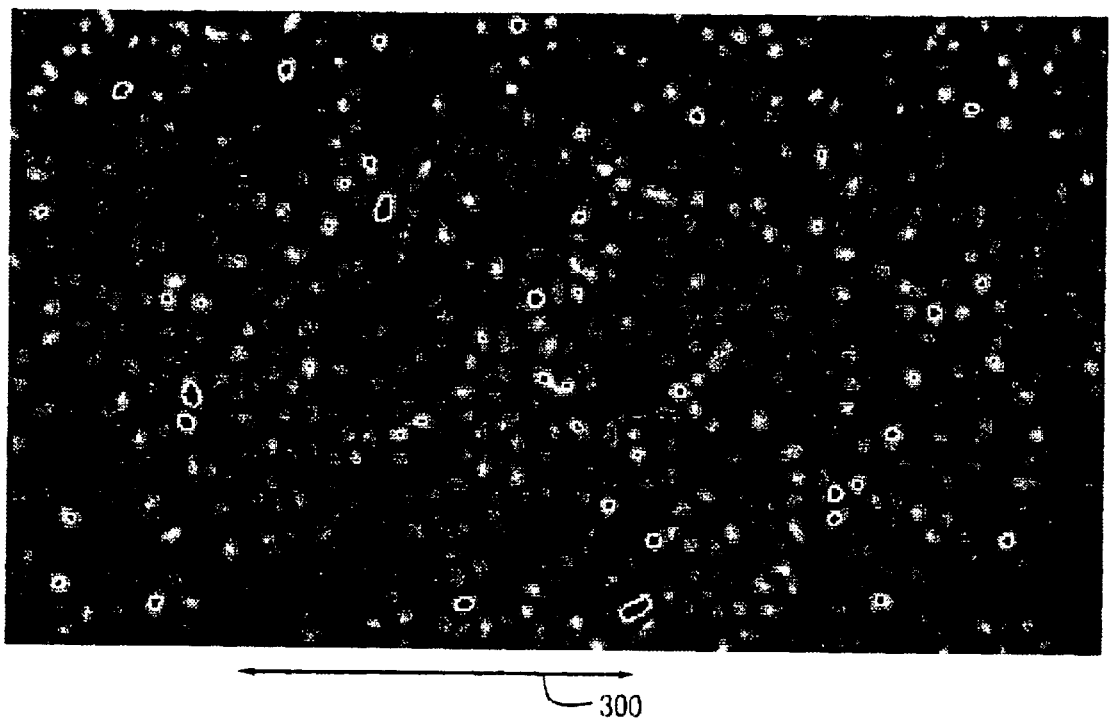
FIG. 13 illustrates a first exemplary embodiment of a speckle pattern formed using the speckle-image-correlation optical position transducer according to this invention.

FIG. 12 is a block diagram outlining one exemplary embodiment of the signal generating and processing circuitry 200. As shown in FIG. 12, the signal generating and processing circuitry 200 includes a controller 210, a light source driver 220, a light detector interface 230, a memory 240, a comparing circuit 250, a comparison result accumulator 260, an interpolation circuit 270, a position accumulator 280, a display driver 290 and an optional input interface 295.

The controller 210 is connected to the light source driver 220 by a control line 211, to the image detector interface 230 by a signal line 212, and to the memory 240 by a signal line 213. Similarly, the controller 210 is connected by signal lines 214–217 to the comparing circuit 250, the comparison result accumulator 260, the interpolation circuit 270 and the position accumulator 280, respectively. Finally, the controller 210 is connected to the display driver 290 by a control line 218 and, if provided, to the input interface 295 by a input signal line 219. The memory 240 includes a previous image portion 242, a current, or subsequent, image portion 244 and a correlation portion 246.

In operation, the controller 210 outputs a control signal over the signal line 211 to the light source driver 220. In response, the light source driver 220 outputs a drive signal to the coherent light source 130 over the signal line 132. Subsequently, the controller 210 outputs a control signal to the image detector interface 230 and to the memory 240 over the signal lines 212 and 213 to store the signal portions received over the signal line 164 from the light detector 160 corresponding to each of the image elements 162 into the previous image portion 242 or the current image portion 244. In particular, the image values from the individual image elements 162 are stored in a two-dimensional array in the previous image portion 242 and the current image portion 244 corresponding to the positions of the individual image elements 162 in the array 166.

Once a first image is stored in the previous image portion 242, the controller 210 waits the predetermined short time period to again output the control signal on the signal line 211 to the light source driver 220 to again drive the coherent light source 130. The image detector interface 230 and the memory 240 are then controlled using signals on the signal lines 212 and 213 to store the resulting image in the current image portion 244.

Then, the controller 210 outputs a signal on the signal line 214 to the comparing circuit 250. In response, the comparing circuit 250 inputs an image value for a particular pixel from the previous image portion 242 over a signal line 252 and inputs the image value for the corresponding pixel, based on the current offset, from the current image portion 244 over the signal line 252. The comparing circuit 250 then applies the particular correlation algorithm to determine a comparison result. The comparing circuit 250 outputs the comparison result on a signal line 254 to the comparison result accumulator 260 for the current correlation offset. Once the comparing circuit 250 has extracted and compared the image value for each of the image elements 162 from the previous image portion 242 and compared them to the corresponding image value stored in the current image portion 244, applied the correlation algorithm and output the comparison result to the comparison result accumulator 260, the value stored in the comparison result accumulator 260 defines the correlation value in absolute units, as shown in FIG. 11. The controller 210 then outputs a signal over the signal line 215 to the comparison result accumulator 260 and to the memory 240 over the signal line 213. As a result, the correlation algorithm result stored in the comparison result accumulator 260 is output and stored in the correlation portion 246 of the memory 240 at a location corresponding to the current offset.

The controller 210 then outputs a signal on the signal line 215 to clear the result accumulator 260. Once all of the comparisons for all of the desired offsets between the previous image stored in the previous image portion 242 and the current image stored in the current image portion 244 have been performed by the comparing circuit 250, and the results accumulated by the comparison result accumulator 260 over a signal line 262 and stored in the correlation portion 246 under control of the controller 210, the controller 210 outputs a control signal over the signal line 216 to the interpolation circuit 270.

In response, the interpolation circuit 270 inputs the correlation results stored in the correlation portion 246 over the signal line 252 and determines the location of a peak or trough of the correlation function and interpolates the data points around and including the peak/trough of the correlation function to fit a curve to the peak/trough of the correlation function to determine the actual sub-pixel displacement. The interpolation circuit 270 then outputs, under control of the signal from the signal controller 210 over the signal line 216, the determined actual sub-pixel displacement value on the signal line 272 to the position accumulator 280. The position accumulator 280, under control of the signal from the signal controller 210 over the signal line 217, adds the displacement value on the signal line 272 to an accumulated displacement stored in the position accumulator 280. The position accumulator 280 then outputs the updated position displacement to the controller 210 over the signal line 282. In response, the controller outputs the updated displacement value to the display driver 290 over the signal line 218. The display driver 290 then outputs drive signals over the signal line 292 to the display device 107 to display the current displacement value.

The input interface 295, if provided, provides an interface between the millimeter/inch button 105 over a signal line 296, the on/off button 105 over a signal line 297 and the set zero position button 105 over a signal line 298. The input interface 295 provides an interface between these buttons 105 and the controller 210 and outputs the control signals from the buttons 105 over one or more signal lines 219 to the controller 210. However, it should be appreciated that the input interface 295 can be omitted, along with the signal lines 219. In this case, the signal lines 296–298 from the various buttons 105 on the readhead assembly 106 are connected directly to the controller 210.

As indicated above, any convenient or appropriate known or later developed correlation algorithm can be used by the comparing circuit 250 to compare the previous image stored in the previous image portion 242 with the current image stored in the current image portion 244 on a pixel-by-pixel basis based on the current offset. In particular, each of the previous and current or subsequent images comprises M×N pixels arranged in a two dimensional array of M rows of pixels and N columns of pixels. One convenient correlation algorithm is:

$$R(p) = \left[\sum_{q=1}^{M}\left(\sum_{m=1}^{N} I_1(m) * I_2(p+m)\right)\right] / M \qquad (2)$$

where:
is the current displacement or offset value, in pixels;
R(p) is the correlation value for the current displacement value;
q is the current row counter;
m is the current pixel counter for the current row;
$I_1$ is the image value for the current pixel in the previous image; and
$I_2$ is the image value for the subsequent or second image.

It should be appreciated that cyclical boundary conditions are assumed.

As indicated in Eq. 2, the correlation for each row is obtained and summed. The sum is then averaged over the M rows to obtain an average, and noise-reduced, correlation function. This average correlation function is desirable to ensure that the data points will be stable to roughly the resolution to be obtained by interpolating the correlation function peak. Thus, to obtain roughly nanometer resolution by interpolating the correlation peak when each data point represents approximately $1\mu$ the data points need to be stable roughly to the desired nanometer resolution value.

To achieve this subpixel resolution and accuracy, a function f(x) is numerically fit to the peak data point and the data points, surrounding the peak data point, that are well above the noise level 310. Subsequently, to find the actual displacement peak for the numerically fit function f(x), i.e., to find the absolute maximum or minimum of the numerically fit function f(x), the numerically fit function f(x) is differentiated to determine the displacement value x when the slope of f(x) is equal to zero.

In various exemplary embodiments, the numerically fit function f(x) is a quadratic function. However, it should be appreciated that other functions can be used. It should also be appreciated that this method is applicable not only to the correlation method shown in Eq. 2, but also to other methods. For example, it is possible to determine the displacement by subtracting shifted images and finding the minimum in the resulting correlation function.

As indicated above, in speckle correlation, the previous and subsequent speckle images are acquired before and after displacement. The previous and subsequent speckle images are then correlated to determine the displacement. To achieve high resolution, it is important that the average speckle size be approximately equal to, or larger than, the pixel size of the image elements 162 of the light detector 160. Moreover, in various exemplary embodiments of the readhead 126 according to this invention, the average speckle size is greater than, and in other exemplary embodiments is up to three to four times, the pixel size of the image elements 162. For linear encoders, which have a motion only along a single measurement axis 300, a linear correlation is determined for each row. Then, the correlation functions for all rows are averaged, as outline above with respect to Eq. 2.

Since the speckle size is approximately equal to, or larger than, the pixel size, lateral displacements in directions perpendicular to the measurement direction 300 that occur between acquiring the subsequent and previous images result in a significant de-correlation in the compared speckle patterns. This thus causes substantial positional errors to be generated. The speckle size at the object plane, the plane of optically diffusing, or optically rough, surface 104, in the direction perpendicular to the measurement direction is approximately equal to the size of the individual elements 162 in the direction perpendicular to the measurement axis 300 divided by the magnification in the direction perpendicular to the measurement axis 300. Accordingly, any lateral motion greater than this speckle size results in effectively a complete de-correlation between the previous and subsequent images.

In various exemplary embodiments of the readhead assembly 106 of the speckle-image-based optical position transducer according to this invention, the pinhole 152 of the pinhole plate 150 is modified to shape the speckles such that the speckles are substantially elongated in the direction perpendicular to the measurement axis 300 relative to the size of the image elements 162 in the direction perpendicular to the measurement axis 160 divided by the corresponding magnification value. Consequently, the same speckle distribution will be sampled by a given row as the optically diffusing, or optically rough, surface 104 is displaced laterally in the direction perpendicular to the measurement axis.

Figure 14:
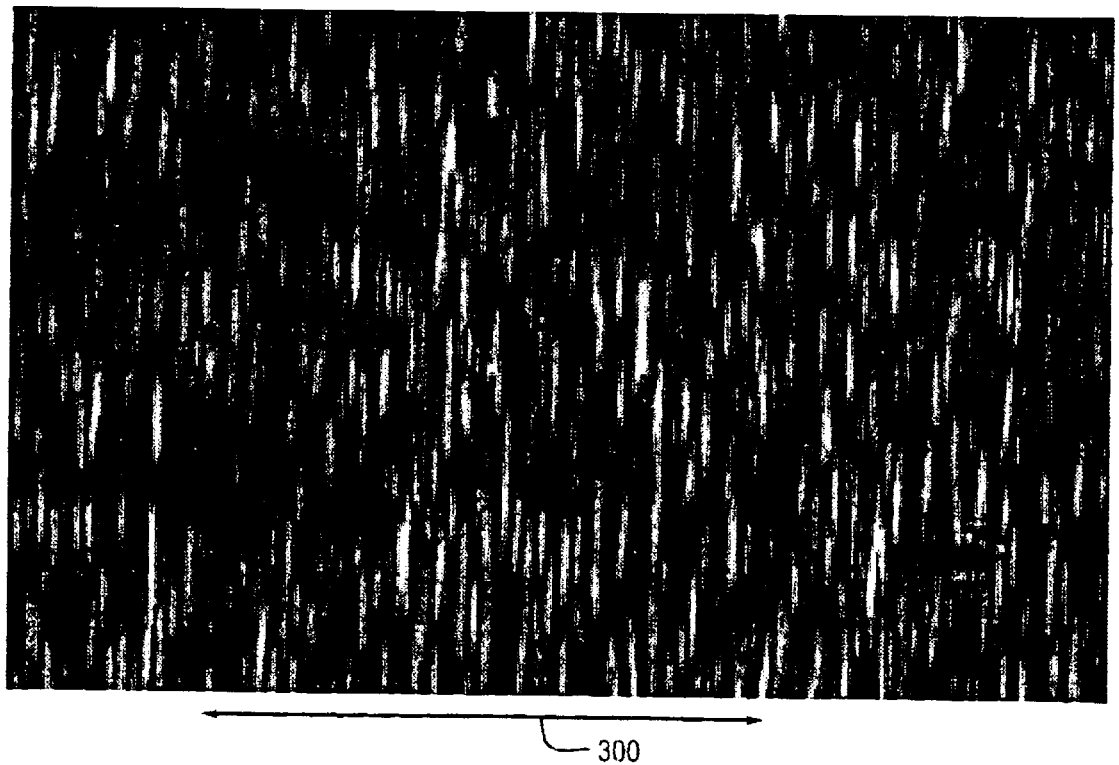
FIG. 14 illustrates a second exemplary embodiment of a speckle pattern formed using the speckle-image-correlation optical position transducer according to this invention.

In particular, both the size and the shape of the speckles is determined by the shape and size of the pinhole aperture 152. Conventionally, only circular pinholes have been used. Such circular pinholes generate the speckle pattern shown in FIG. 13. Such circular pinholes produce speckles that have approximately equal lengths and widths, statistically, in the directions along and perpendicular to the measurement axis 300. In contrast, by shaping the pinhole 152 so that it is no longer circular, the speckles are shaped as shown in FIG. 14. In particular, FIG. 14 was generated using a rectangular pinhole 152, with the long leg of the rectangular pinhole 152 extending along the measurement axis 300. In particular, this rectangular pinhole 152 has a large aspect ratio. As FIG. 14 clearly shows, the speckles are elongated in the direction perpendicular to the measurement axis 300. Therefore, the same speckle distribution will sampled by a given row even if the optically diffusing, or optically rough, surface 104 is laterally displaced one or more pixels in the direction perpendicular to the measurement axis 300. Thus, the correlation and the accuracy will be unaffected by such lateral displacements.

In the various exemplary embodiments described above, and especially in the exemplary embodiments of the position measuring device 100 shown in FIGS. 1 and 3, it is possible to move the readhead assembly 106 relative to the scale member 102 along the measurement axis 300 at relative high speeds. However, such high speed relative motion between the readhead assembly 106 and the scale member 102 are problematic, because the speckle images captured by the light detector 160 are effectively smeared across the array 166 of individual image elements 162. This is analogous to an effect that occurs in cameras, when the image is smeared across the film when objects within the field of view move a substantial distance while the camera shutter is open.

As indicated above, in the speckle-image-based optical position transducers according to this invention, the optic system of the readhead assembly 106 is designed so that the speckles have a size in the image projected onto the array 166 of the image elements 162 that is approximately equal to, or larger than, the size of the image elements 162. In contrast, the speckles in the plane of the optically diffusing, or optically rough, surface 104 have a size that is smaller by the magnification value of the optic system of the readhead assembly 106.

If the image array is operated to have an exposure time $\tau$ and the readhead moves relative to the optically diffusing, or optically rough, surface 104 along the measurement axis 300 at a velocity v, the speckles will thus move a distance $\Delta = v*\tau$ during the exposure $\tau$. For example, for many uses of the position measuring devices 100, the readhead assembly 106 will move at a velocity relative to the optically diffusing, or optically rough, surface 104 along the measurement axis 300 at a velocity v of 1 m/s. Additionally, in various exemplary embodiments, the light detector 160 will have an exposure time $\tau$ of approximately 100 $\mu$s. In this case, the distance $\Delta x$ will be approximately 100 $\mu$m, which is much larger than the effective pixel size at the object plane, which is approximately equal to, or larger than, the speckle size at the object plane. As a result, at these speeds, the speckle-image-based optical position transducer according to this invention will not function.

To avoid this difficulty, in various exemplary embodiments of the speckle-image-based optical position transducers according to this invention, the coherent light source 130 may be strobed for a short period of time $\tau'$ that is much less than the exposure time $\tau$ for the light detector 160. This effectively freezes the image of the illuminated portion of the optically diffusing, or optically rough, surface 104 during the longer exposure time $\tau$ of the light detector 160. For example, if the velocity v is 1 m/s and the strobe time $\tau'$ is 0.1 $\mu$s, then the distance $\Delta x$ is 0.1 $\mu$m. Because this is much smaller than the speckle and pixel size on the object plane, minimal smearing occurs.

Additionally, by strobing the light source 130 for the short strobe period $\tau'$, it is possible to obtain much higher peak power from the light source 130, by biasing it at much high power levels.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A speckle-image-correlation optical position transducer readhead, the readhead usable to measure a relative displacement along at least a first measurement axis relative to a member having an optically diffusing surface operably positioned at a nominal gap relative to the readhead, at least one of the member and the readhead guided such that the optically diffusing surface remains operably positioned at approximately the nominal gap during the relative displacement, the readhead comprising:

a coherent light source that emits a light beam that illuminates a portion of the optically diffusing surface, the illuminated portion depending on the relative displacement and producing a scattered light that corresponds to the illuminated portion;

an optical system comprising at least a limiting aperture element positioned to receive at least portion of the scattered light from the illuminated portion along an optical axis extending through a limiting aperture of the limiting aperture element, the light source and the limiting aperture configured such that the received scattered light from the illuminated portion overfills the limiting aperture, the limiting aperture transmitting a transmitted light portion of the received scattered light along an optical path of the readhead;

an image detector positioned along the optical path of the readhead to receive the transmitted light, the image detector comprising an array of image elements that are sensitive to the transmitted light, the image elements of the array being spaced apart along at least a first direction of the array corresponding to the first measurement axis, the image elements located along the first direction at a first spacing P; and a light detector interface circuit connected to the image detector, wherein:

the transmitted light creates an intensity pattern on the array of image elements that corresponds to the illuminated portion of the optically diffusing surface, the intensity pattern comprising a plurality of speckles;

the optical path between the limiting aperture and the array of image elements has a nominal fixed length d, the light source has a nominal wavelength $\lambda$, the limiting aperture has a nominal aperture dimension W along a direction parallel to the first measurement axis, and the readhead is configured such that a nominal size S of the speckles included in the plurality of speckles depends predominantly on a relationship between d, $\lambda$, and W when the optically diffusing surface is operably positioned relative to the readhead;

at least one characteristic of the intensity pattern is relatively insensitive to reasonably expected variations in the nominal gap, the at least one characteristic including at least the nominal size S of the speckles; and W is in the range $\lambda(d/P)>W>\lambda(d/20P)$.

2. The speckle-image-correlation optical position transducer readhead of claim 1, wherein the reasonably expected variations in the nominal gap include variations due to at least one of a) establishing the nominal gap in an operable range during a mounting procedure that initially sets the nominal gap, b) bearing system inaccuracy that affects guiding of the at least one of the member and the readhead such that the nominal gap varies during relative displacements and c) variations of the optically diffusing surface from a nominal form such that the nominal gap varies during relative displacements, wherein the nominal form is one of a planar form and a cylindrical form.

3. The speckle-image-correlation optical position transducer readhead of claim 1, wherein the nominal size S of the speckles included in the plurality of speckles depends substantially entirely on the relationship between d, $\lambda$, and W.

4. The speckle-image-correlation optical position transducer readhead of claim 1, wherein the dimension W of the limiting aperture is in the range about $\lambda(d/2P)>W>$about $\lambda(d/6P)$.

5. The speckle-image-correlation optical position transducer readhead of claim 1, wherein the dimension W of the limiting aperture is in the range about $\lambda(d/2P)>W>$about $\lambda(d/4P)$.

6. The speckle-image-correlation optical position transducer readhead of claim 1, wherein the optical system further comprises a magnifying lens arranged along the optical axis between the optically diffusing surface and the limiting aperture, wherein:

the magnifying lens is arranged at a fixed distance F from the limiting aperture, where F equals the focal length of the lens; and the readhead is configured such that the intensity pattern translates along the first direction of the array at a magnified rate relative to the rate of the relative displacement between the transducer readhead and the member having the optically diffusing surface along the first measurement axis; and at least one of a) the magnified rate and b) a dilation characteristic of the intensity pattern is relatively insensitive to the reasonably expected variations in the nominal gap.

7. The speckle-image-correlation optical position transducer readhead of claim 6, wherein the dimension W of the limiting aperture is in the range about $\lambda(d/2P)>W>$about $\lambda(d/6P)$.

8. The speckle-image-correlation optical position transducer readhead of claim 7, wherein the dimension W of the limiting aperture is in the range about $\lambda(d/2P)>W>$about $\lambda(d/4P)$.

9. The speckle-image-correlation optical position transducer readhead of claim 6, wherein the magnified rate is approximately 10 times the rate of the relative displacement between the transducer readhead and the member having the optically diffusing surface along the first measurement axis.

10. The speckle-image-correlation optical position transducer readhead of claim 6, wherein the magnifying lens comprises a cylindrical-type lens oriented such that:

the intensity pattern translates along the first direction of the array at a magnified rate relative to the rate of the relative displacement between the transducer readhead and the member having the optically diffusing surface along the first measurement axis;

the intensity pattern translates along a second direction of the array perpendicular to the first direction at a rate that is not magnified relative to a rate of lateral offset displacement between the transducer readhead and the member having the optically diffusing surface along a direction perpendicular to the first measurement axis; and when the intensity pattern is displaced along the second direction by an amount due a lateral offset of the readhead relative to the optically diffusing surface along a direction perpendicular to the first measurement axis, a correlation operation performed using the intensity pattern to determine the relative displacement along the first measurement axis is affected less by that lateral offset than would be the case for a lens that was axially symmetric about the optical axis.

11. The speckle-image-correlation optical position transducer readhead of claim 10, the limiting aperture having the nominal aperture dimension W along the direction parallel to the first measurement axis and a second aperture dimension K along the direction perpendicular to the first measurement axis, and the readhead is configured such that:

the nominal size S of the speckles comprises a dimension of the speckles along the first direction of the array;

a second nominal size T of the speckles comprises a dimension of the speckles along a second direction of the array that is perpendicular to the first direction of the array;

the dimension K is chosen to satisfy the relation $(1/10) W<K<W$;

the second nominal size T depends predominantly on a relationship between d, $\lambda$, and K, such that when the optically diffusing surface is operably positioned relative to the readhead T is greater than S; and when the intensity pattern is displaced along the second direction by the amount due a lateral offset of the readhead relative to the optically diffusing surface along a direction perpendicular to the first measurement axis, the correlation operation performed using the intensity pattern to determine the relative displacement along the first measurement axis is affected by still less by that lateral offset than would be the case if K was the same as W, the effect being relatively decreased for relatively smaller values of K.

12. The speckle-image-correlation optical position transducer readhead of claim 1, the limiting aperture having the nominal aperture dimension W along the direction parallel to the first measurement axis and a second aperture dimension K along a direction perpendicular to the first measurement axis, and the readhead is configured such that:

the nominal size S of the speckles comprises a dimension of the speckles along the first direction of the array;

a second nominal size T of the speckles comprises a dimension of the speckles along a second direction of the array that is perpendicular to the first direction of the array;

the dimension K is chosen to satisfy the relation (1/10) W<K<W;

the second nominal size T depends predominantly on a relationship between d, $\lambda$, and K, such that when the optically diffusing surface is operably positioned relative to the readhead T is greater than S; and when the intensity pattern is displaced along the second direction by an amount due a lateral offset of the readhead relative to the optically diffusing surface along a direction perpendicular to the first measurement axis, a correlation operation performed using the intensity pattern to determine the relative displacement along the first measurement axis is affected less by that lateral offset than would be the case if K was the same as W, the effect being relatively decreased for relatively smaller values of K.

13. The speckle-image-correlation optical position transducer readhead of claim 12, wherein the dimension W of the limiting aperture is in the range about $\lambda(d/2P)$>W>about $\lambda(d/6P)$.

14. The speckle-image-correlation optical position transducer readhead of claim 13, wherein the dimension K is chosen to satisfy the relation about (1/8)W<K<about (1/2)W.

15. The speckle-image-correlation optical position transducer readhead of claim 14, wherein the dimension W of the limiting aperture is in the range about $\lambda(d/2P)$>W>about $\lambda(d/4P)$.

16. The speckle-image-correlation optical position transducer readhead of claim 1, wherein the readhead is configured such that the light beam is generally co-linear with the optical axis over at least the portion the optical axis located between the limiting aperture and the illuminated portion of the optically diffusing surface.

17. The speckle-image-correlation optical position transducer readhead of claim 16, wherein the light beam is initially emitted by the light source along a direction that is not co-linear with the optical axis and the readhead further comprises a partially reflective surface that is positioned to deflect the emitted light beam such that it becomes co-linear with the optical axis.

18. The speckle-image-correlation optical position transducer readhead of claim 1, wherein the readhead further comprises at least one reflective element that is at least partially reflective, and the readhead is configured such that the at least one reflective element is located along the optical path between the limiting aperture and the array of image elements to fold the optical path by deflecting the transmitted light.

19. The speckle-image-correlation optical position transducer readhead of claim 18, wherein the readhead is configured such that at least one outer dimension of the readhead is made relatively more compact than it could be made if the optical path was not folded between the limiting aperture and the array of image elements.

20. The speckle-image-correlation optical position transducer readhead of claim 18, wherein the at least one reflective element comprises at least one reflective surface portion of a block of optically transparent material, and the readhead is configured such that at least a portion of the folded optical path lies within the optically transparent material.

21. The speckle-image-correlation optical position transducer readhead of claim 1, wherein the limiting aperture comprises one of a) a pinhole aperture, b) a non-circular pinhole aperture, c) a reverse limiting aperture, the reverse limiting aperture transmitting the transmitted light portion of the received scattered light along the optical path between the limiting aperture and the array of image elements by reflecting the transmitted light portion along the optical path, d) a non-circular reverse limiting aperture and e) a reverse limiting aperture that reflects the transmitted light portion along a folded optical path between the limiting aperture and the array of image elements.

22. The speckle-image-correlation optical position transducer readhead of claim 1, wherein the readhead is configured such that the transmitted light arises from a region of the optically diffusing surface that is smaller than and contained within the illuminated portion of the optically diffusing surface when the optically diffusing surface is operably positioned relative to the readhead.

23. The speckle-image-correlation optical position transducer readhead of claim 1, wherein the at least a first measurement axis comprises a linear path along a linear track on a planar surface.

24. The speckle-image-correlation optical position transducer readhead of claim 1, wherein:

the at least a first measurement axis comprises a circular path along an annular track on the surface of a disk, the disk having a disk axis perpendicular to the surface of the disk; and the speckle-image-correlation optical position transducer is usable to measure rotational displacement of the disk about the disk axis.

25. The speckle-image-correlation optical position transducer readhead of claim 1, wherein:

the at least a first measurement axis comprises a circumferential path around the surface of a cylinder having a cylinder axis; and the speckle-image-correlation optical position transducer is usable to measure rotational displacement of the cylinder about the cylinder axis.

26. The speckle-image-correlation optical position transducer readhead of claim 1, wherein:

the at least a first measurement axis comprises first and second orthogonal measurement axes;

the image elements of the array are spaced apart along the first direction of the array corresponding to the first measurement axis at the first spacing P, and the image elements of the array are also spaced apart along a second direction of the array perpendicular to the first direction and corresponding to the second measurement axis at a second spacing Q;

relative displacement along the first and second orthogonal measurement axes causes translation of the intensity pattern along the first and second directions of the array, respectively; and the speckle-image-correlation optical position transducer is usable to measure the relative displacement along the first and second orthogonal measurement axes relative to the member having an optically diffusing surface.

27. The speckle-image-correlation optical position transducer readhead of claim 1, wherein the light detector interface circuitry outputs a signal value from at least some of the image elements of the array of image elements, the signal values representative of image intensities of the intensity pattern created by the transmitted light on those image elements.

28. The speckle-image-correlation optical position transducer readhead of claim 27, further comprising at least one additional signal generating and processing circuitry element that inputs the signal values output by the light detector interface.

29. The speckle-image-correlation optical position transducer readhead of claim 28, wherein the at least one additional signal generating and processing circuitry element comprises a signal-processing controller.

30. The speckle-image-correlation optical position transducer readhead of claim 29, wherein:

the at least one additional signal generating and processing circuitry element stores a first intensity pattern based on the signal values of the array of image elements corresponding to the illuminated portion of the optically diffusing surface at a first relative position along at least the first measurement axis;

the at least one additional signal generating and processing circuitry element acquires a second intensity pattern based on the signal values of the array of image elements corresponding to the illuminated portion of the optically diffusing surface at a second relative position along at least the first measurement axis; and the signal-processing controller determines the relative displacement along at least the first measurement axis based on a correlation operation based on the first and second intensity patterns and at least the first spacing P of the image elements of the array along the first direction of the array corresponding to the first measurement axis.

31. The speckle-image-correlation optical position transducer readhead of claim 1, further comprising at least one external alignment surface, wherein when the external alignment surface is arranged in a prescribed orientation relative to the a first measurement axis, the intensity pattern translates across the array nominally only along the first direction.

32. The speckle-image-correlation optical position transducer readhead of claim 31, further comprising a second external alignment surface orthogonal to the first external alignment surface, wherein when the second external alignment surface is also arranged in a prescribed orientation relative to optically diffusing surface, the optical axis is arranged along a direction that is nominally normal to the illuminated portion of the optically diffusing surface.

33. The speckle-image-correlation optical position transducer readhead of claim 1, wherein the readhead includes no lenses along the optical path between the limiting aperture and the array of image elements.

* * * * *